(12) United States Patent
Wang et al.

(10) Patent No.: US 12,262,298 B2
(45) Date of Patent: Mar. 25, 2025

(54) DATA TRANSFER METHOD, APPARATUS AND DEVICE, AND COMPUTER-READABLE STORAGE MEDIUM

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 17/733,523

(22) Filed: Apr. 29, 2022

(65) Prior Publication Data

US 2022/0353784 A1 Nov. 3, 2022

(30) Foreign Application Priority Data

Apr. 30, 2021 (CN) .......................... 202110482258.X
Oct. 15, 2021 (CN) .......................... 202111205922.2

(51) Int. Cl.
*H04W 4/00* (2018.01)
*H04W 40/04* (2009.01)
*H04W 40/12* (2009.01)
*H04W 40/24* (2009.01)
*H04W 76/15* (2018.01)

(52) U.S. Cl.
CPC ........... *H04W 40/12* (2013.01); *H04W 40/04* (2013.01); *H04W 40/246* (2013.01); *H04W 76/15* (2018.02)

(58) Field of Classification Search
CPC ... H04W 40/12; H04W 40/04; H04W 40/246; H04W 76/15; H04W 76/11; H04W 76/12; H04W 88/04; H04W 40/22; H04W 76/10; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS 12,052,629 B2 * 7/2024 Chaponniere ..... H04W 36/0077
2011/0222436 A1 9/2011 Zee et al.
(Continued)

FOREIGN PATENT DOCUMENTS

EP 3 911 019 A1 11/2021
WO 2020/156020 A1 8/2020
(Continued)

OTHER PUBLICATIONS

3rd Generation Partnership Project; Technical Specification Group Radio Access Network; NG-RAN; F1 application protocol (F1AP) (Release 17), TS 38.473, V17.0.0, Apr. 2022.
(Continued)

*Primary Examiner* — Phuongchau Ba Nguyen
(74) *Attorney, Agent, or Firm* — Jefferson IP Law, LLP

(57) ABSTRACT

A data transfer method, apparatus and device, and a computer-readable storage medium are provided. The method executed by a third node includes sending a first request message to a fourth node, and receiving a first response message sent by the fourth node, the first response message being indicative of connection of a first node to the fourth node through a second node. By the method, the connection of the first node to the fourth node through the second node is achieved.

15 Claims, 25 Drawing Sheets

(56) References Cited

U.S. PATENT DOCUMENTS

| | | | |
|---|---|---|---|
| 2019/0380128 A1* | 12/2019 | Park | H04W 88/10 |
| 2019/0380172 A1 | 12/2019 | Xu et al. | |
| 2020/0296696 A1* | 9/2020 | Goldhamer | H04W 4/40 |
| 2021/0368417 A1* | 11/2021 | Luo | H04W 40/22 |
| 2022/0022228 A1* | 1/2022 | Wang | H04W 76/14 |
| 2023/0142993 A1* | 5/2023 | Wang | H04W 76/14 |
| | | | 370/315 |
| 2023/0199877 A1* | 6/2023 | Chang | H04W 76/14 |
| | | | 370/329 |
| 2023/0370945 A1* | 11/2023 | Chen | H04W 40/22 |

FOREIGN PATENT DOCUMENTS

| | | |
|---|---|---|
| WO | 2020/159291 A1 | 8/2020 |
| WO | 2020/197205 A1 | 10/2020 |
| WO | 2021/060941 A1 | 4/2021 |

OTHER PUBLICATIONS

3rd Generation Partnership Project; Technical Specification Group Radio Access Network; NR; Radio Resource Control (RRC) protocol specification (Release 16), TS 38.331, V16.8.0, Mar. 2022.

3rd Generation Partnership Project; Technical Specification Group Radio Access Network; NG-RAN; E1 Application Protocol (E1AP) (Release 17), TS 38.463, V17.0.0, Apr. 2022.

3rd Generation Partnership Project; Technical Specification Group Radio Access Network; Evolved Universal Terrestrial Radio Access (E-UTRA); Radio Resource Control (RRC); Protocol specification (Release 17), TS 36.331, V17.0.0, Mar. 2022.

International Search Report dated Jul. 28, 2022, issued in International Patent Application No. PCT/KR2022/006213.

European Search Report dated Jan. 21, 2025, issued in European Application No. 22796225.5.

* cited by examiner

Send a fourth configuration request message to a second node to indicate the second node to prohibit the access of a first node —S501

FIG.13

DATA TRANSFER METHOD, APPARATUS AND DEVICE, AND COMPUTER-READABLE STORAGE MEDIUM

CROSS-REFERENCE TO RELATED APPLICATION(S)

This application is based on and claims priority under 35 U.S.C. § 119(a) of a Chinese patent application number 202110482258.X, filed on Apr. 30, 2021, in the China National Intellectual Property Administration, and of a Chinese patent application number 202111205922.2, filed on Oct. 15, 2021, in the China National Intellectual Property Administration, the disclosure of each of which is incorporated by reference herein in its entirety.

BACKGROUND

1. Field

The disclosure relates to the field of wireless communication technology. More particularly, the disclosure relates to a data transfer method, apparatus and device, and a computer-readable storage medium.

2. Description of Related Art

In order to meet the increasing requirements for wireless data communication services since the deployment of 4th generation (4G) mobile networks communication systems, efforts have been made to develop improved 5th generation (5G) mobile networks) or quasi-5G communication systems. Therefore, 5G or quasi-5G communication systems are also called "super-4G networks" or "post-long term evolution (LTE) systems."

Wireless communication is one of the most successful innovations in modern history. Recently, the number of subscribers to wireless communication services has exceeded 5 billion, and it continues to grow rapidly. Due to the increasing popularity of smart phones and other mobile data devices (such as tablet computers, notebook computers, netbooks, e-book readers, and machine type devices) among consumers and enterprises, the demand for wireless data services is growing rapidly. In order to meet the rapid growth of mobile data services and support new applications and deployments, it is important to improve the efficiency and coverage of wireless interfaces.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a data transfer method, apparatus and device, and a computer-readable storage medium to solve the problem of how user equipment accesses a network through a relay terminal.

Additional aspects will be set forth in part in the description which follows and, in part, will be apparent from the description, or may be learned by practice of the presented embodiments.

In accordance with an aspect of the disclosure, a method executed by a third node is provided. The method includes sending a first request message to a fourth node, and receiving a first response message sent by the fourth node, the first response message being indicative of connection of a first node to the fourth node through a second node.

In an embodiment, the first request message includes at least one of the user identification information of an F1 interface, the user identification information of the F1 interface being used to identify at least one of the first node and the second node, first identification information of the first node, the first identification information being used to identify the first node on a link, second identification information of the first node, third identification information of the first node, fourth identification information of the first node, first indication information of the first node, identification information of the second node, a first container, the first container including a third request message sent by the first node, and a second container, the second container including at least one of the third request message sent by the first node, the first identification information, and the second identification information.

In an embodiment, the first response message includes at least one of the user identification information of the F1 interface, the user identification information of the F1 interface being used to identify at least one of the first node and the second node, first identification information of the first node, the first identification information being used to identify the first node on the link, second identification information of the first node, identification information of the second node, and a third container, the third container including a response message in response to the third request message sent by the first node.

In an embodiment, before sending a first request message to a fourth node, the method further includes receiving a second request message sent by the second node, the second request message including the third request message sent by the first node to the second node, the third request message includes at least one of the first identification information of the first node, the first identification information being used to identify the first node on the link, and second identification information of the first node.

In an embodiment, the third request message is a connection setup request message sent by the first node.

In an embodiment, after receiving a first response message sent by the fourth node, the method further includes sending a second response message to the second node, so that the second node sends a third response message to the first node, wherein the third response message includes the response message in response to the third request message sent by the first node, and the second response message includes at least one of the first identification information of the first node, the first identification information being used to identify the first node on the link, second identification information of the first node, third identification information of the first node, fourth identification information of the first node, and the response message in response to the third request message sent by the first node.

In an embodiment, fourth request information sent by the fourth node is received, the fourth request information being used to configure a resource used when the second node transfers data of the first node, and a fourth response message is sent to the fourth node, the fourth response message being used to transfer configuration information generated by the third node.

In an embodiment, the fourth request information includes at least one of the first identification information of the first node, the first identification information being used to identify the first node on the link, second identification information of the first node, the second identification information being used to identify the first node, third identification information of the first node, fourth identification information of the first node, and information about a bearer or resource, the bearer being used to transfer data of the first node, wherein the information about a bearer or resource includes at least one of the identification information of the bearer or identification information of the resource, quality of service (QoS) parameter information of the bearer or QoS parameter information of the resource, indication information of a default bearer or the resource, indication information for setting up the default bearer or the resource, and indication information of a user to which the data of the first node belongs.

In an embodiment, the fourth response message includes at least one of the configuration information of a radio link control (RLC) layer, configuration information of a logical channel, first identification information of the first node, the first identification information being used to identify the first node on the link, second identification information of the first node, the second identification information of user being used to identify the first node, and first default configuration information or first general configuration information.

In accordance with another aspect of the disclosure, a method executed by a fourth node is provided. The method includes receiving a first request message sent by a third node, and sending a first response message to the third node, the first response message being indicative of connection of a first node to the fourth node through a second node.

In an embodiment, a first configuration message is sent to the second node, the first configuration message being used to configure data transfer between the second node and other first nodes except the first node.

In an embodiment, the first configuration message includes at least one of the identification information of a user served by the second node, configuration information of an air interface link, the air interface link being a link between the second node and the third node, and second default configuration information or second general configuration information.

In accordance with another aspect of the disclosure, a method executed by a third node is provided. The method includes receiving a first configuration request message sent by a fourth node, and sending a first configuration response message to the fourth node, the first configuration request message and the first configuration response message include configuration for data transfer of a first node through a second node.

In an embodiment, the first configuration request message includes at least one of the user identification information of an F1 interface, the user identification information of the F1 interface being used to identify at least one of the first node and the second node, first configuration information, the first configuration information being about a configuration performed when the first node is configured, second configuration information, the second configuration information being about a configuration used when the second node is configured, and third configuration information, the third configuration information being used to notify configuration information required for the generation of configuration of the second node.

In an embodiment, the first configuration information includes at least one of the identification information of a radio bearer, information about the quality of service (QoS) of the radio bearer, a fourth container, the fourth container including a control signaling message or a packet data convergence protocol service data unit (PDCP PDU), and the PDCP PDU including the control signaling message, first mapping information, and information about a first tunnel, the information about the first tunnel being indicative of information about the fourth node.

In an embodiment, the first mapping information includes at least one of the first identification information of user data, first adaptation layer information, first indication information, the first indication information being indicative of a resource used to transfer data.

In an embodiment, the information about the first tunnel includes at least one of the identification information of the first tunnel, address information of the first tunnel, endpoint identification information of the first tunnel, header information for a data packet, indication information of a data transmission direction, and first tunnel mapping information.

In an embodiment, the first tunnel mapping information includes at least one of the first information of a data tunnel, second adaptation layer information, and second indication information, the second indication information being indicative of a resource used to transfer data.

In an embodiment, the second configuration information includes at least one of the third indication information, the third indication information being indicative of a resource used to transfer data, QoS information of user data, a fifth container, the fifth container including a control signaling message or a PDCP PDU, and the PDCP PDU includes the control signaling message, second mapping information, and second tunnel mapping information, the second tunnel mapping information being indicative of data carried by the resource indicated by the third indication information.

In an embodiment, the second mapping information includes at least one of the second identification information of user data, and third adaptation layer information.

In an embodiment, the second tunnel mapping information includes at least one of the fourth adaptation layer information, and information about the first tunnel.

In an embodiment, the information about the first tunnel includes at least one of identification information of the first tunnel, address information of the first tunnel, endpoint identification information of the first tunnel, header information for a data packet, and indication information of a data transmission direction.

In an embodiment, the third configuration information includes at least one of the fourth indication information, the fourth indication information being indicative of a resource used to transfer data, first data packet information, and seventh indication information of a resource bearing user data.

In an embodiment, the first data packet information includes at least one of the user identification information of the F1 interface, the user identification information of the F1 interface being used to identify at least one of the first node and the second node, first identification information of the first node, the first identification information being used to identify the first node on the link, second identification information of the first node, the second identification information being used to identify the first node, identification information of a radio bearer, fifth data identification information, identification information of a logical channel of a sidelink, and identification information of a logical channel of an air interface link.

In an embodiment, the first configuration response message includes at least one of the user identification information of the F1 interface, the user identification information of the F1 interface being used to identify at least one of the first node and the second node, fourth configuration information, the fourth configuration information being indicative of configuration information of data for the first node, first resource configuration information for the first node, second resource configuration information for the second node, and third resource configuration information.

In an embodiment, the fourth configuration information includes at least one of the identification information of a radio bearer, and information of a second tunnel.

In an embodiment, the information of the second tunnel includes at least one of the identification information of the second tunnel, address information of the second tunnel, and endpoint identification information of the second tunnel.

In an embodiment, the second resource configuration information includes at least one of the fifth indication information, the fifth indication information being indicative of a resource used to transfer data, second data packet information, and eighth indication information of a resource bearing user data.

In an embodiment, the second data packet information includes at least one of the user identification information of the F1 interface, the user identification information of the F1 interface being used to identify at least one of the first node and the second node, first identification information of the first node, the first identification information being used to identify the first node on the link, second identification information of the first node, the second identification information being used to identify the first node, identification information of a radio bearer, sixth data identification information, identification information of a logical channel of a sidelink, and identification information of a logical channel of an air interface link.

In accordance with another aspect of the disclosure, a method executed by a fourth node is provided. The method includes sending a first configuration request message to a third node, and receiving a first configuration response message sent by the third node, the first configuration request message and the first configuration response message include configuration for data transfer of a first node through a second node.

In an embodiment, a second configuration request message is sent to the first node or the second node, the second configuration request message being used to configure data transfer of the first node or the second node.

In an embodiment, the fourth node includes a fifth node and a sixth node, which is characterized by further including the fifth node transfers a third configuration request message to the sixth node, the third configuration request message being used to configure data transfer of the sixth node.

In accordance with another aspect of the disclosure, a method executed by a fourth node is provided. The method includes sending a fourth configuration request message to a second node to indicate the second node to prohibit the access of a first node.

In an embodiment, the fourth configuration request message includes at least one of the indication information for prohibiting the access of the first node, and time information when prohibiting the access of the first node.

In a sixth aspect, a method executed by a second node is provided. The method includes receiving a fourth configuration request message sent by a fourth node, and prohibiting the access of a first node according to the fourth configuration request message.

In accordance with another aspect of the disclosure, an apparatus applied to a third node is provided. The apparatus includes a first processing module, configured to send a first request message to a fourth node, and a second processing module, configured to receive a first response message sent by the fourth node, the first response message being indicative of connection of a first node to the fourth node through a second node.

In accordance with another aspect of the disclosure, an apparatus applied to a fourth node is provided. The apparatus includes a third processing module, configured to receive a first request message sent by a third node, and a fourth processing module, configured to send a first response message to the third node, the first response message being indicative of connection of a first node to the fourth node through a second node.

In accordance with another aspect of the disclosure, an apparatus applied to a third node is provided. The apparatus includes a fifth processing module, configured to receive a first configuration request message sent by a fourth node, and a sixth processing module, configured to send a first configuration response message to the fourth node, the first configuration request message and the first configuration response message include configuration for data transfer of a first node through a second node.

In accordance with another aspect of the disclosure, an apparatus applied to a fourth node is provided. The apparatus includes a seventh processing module, configured to send a first configuration request message to a third node, and an eighth processing module, configured to receive a first configuration response message sent by the third node, the first configuration request message and the first configuration response message include configuration for data transfer of a first node through a second node.

In accordance with another aspect of the disclosure, an apparatus applied to a fourth node is provided. The apparatus includes a ninth processing module, configured to send a fourth configuration request message to a second node to indicate the second node to prohibit the access of a first node.

In accordance with another aspect of the disclosure, an apparatus applied to a second node is provided. The apparatus includes a tenth processing module, configured to receive a fourth configuration request message sent by a fourth node, and an eleventh processing module, configured to prohibit the access of a first node according to the fourth configuration request message.

In accordance with another aspect of the disclosure, a third node is provided. The third node includes a processor, a memory and a bus, the bus is configured to connect the processor and memory, the memory is configured to store operation instructions, and the processor is configured to execute the method in any of the first aspect and the third aspect of the disclosure by calling the operation instructions.

In accordance with another aspect of the disclosure, a fourth node is provided. The fourth node includes a processor, a memory and a bus, the bus is configured to connect the processor and memory, the memory is configured to store operation instructions, and the processor is configured to execute the method in any of the second, fourth, and fifth aspects of the disclosure by calling the operation instructions.

In accordance with another aspect of the disclosure, a second node is provided. The second node includes a processor, a memory and a bus, the bus is configured to connect the processor and memory, the memory is configured to store operation instructions, and the processor is configured to execute the method in the sixth aspect of the disclosure by calling the operation instructions.

In accordance with another aspect of the disclosure, a computer-readable storage medium, storing a computer program, which is used to execute the method in any of the first, second, third, fourth, fifth, and sixth aspects of the disclosure is provided.

The technical solutions provided by the embodiments of the disclosure have at least the following beneficial effects.

A third node sends a first request message to a fourth node, and receives a first response message sent by the fourth node, the first response message being indicative of connection of a first node to the fourth node through a second node. In this way, the connection of the first node to the fourth node through the second node is realized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a schematic flowchart of data transfer according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various operations, methods, steps in processes, measures, and solutions that have been discussed in the disclosure can be alternated, changed, combined, or deleted. The various steps and various solutions in the disclosure can be combined. Some steps in an embodiment of the disclosure can also be combined into a new solution, without all the steps in the embodiment.

It should be further understood that the term "include" used in the specification of the disclosure refers to the presence of the described features, integers, steps, operations, elements and/or components, but does not exclude the presence or addition of one or more other features, integers, steps, operations, elements, components, and/or groups thereof. It should be understood that when an element is "connected" or "coupled" to other element, it can be connected or coupled to the other element directly or by an intermediate element. In addition, the "connected" or "coupled" used herein may include wireless connection or wireless coupling. The term "and/or" used herein includes all or any unit and all combinations of one or more associated listed items.

In order to better understand and explain the solutions of the embodiments of the disclosure, some technologies involved in the embodiments of the disclosure are briefly described below.

Figure 1:
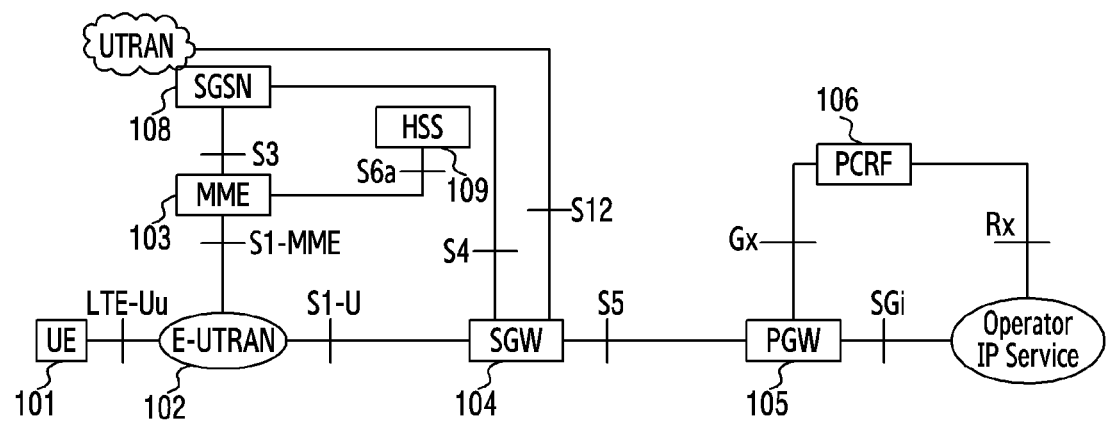
FIG. 1 is a schematic diagram of a system architecture of system architecture evolution (SAE) according to an embodiment of the disclosure.

FIG. 1 shows an example a wireless network according to an embodiment of the disclosure. The embodiment of the wireless network shown in FIG. 1 is for illustration only. Other embodiments of the wireless network can be used without departing from the scope of the disclosure.

Referring to FIG. 1, a system architecture of System Architecture Evolution (SAE) is illustrated. User Equipment (UE) 101 is terminal equipment for receiving data. An Evolved Universal Terrestrial Radio Access Network (E-UTRAN) 102 is a radio access network, which includes a macro base station (eNodeB/NodeB) that provides an interface for the UE to access the radio network. A Mobility Management Entity (MME) 103 is responsible for managing mobility context, session context and security information of the UE. A Serving Gateway (SGW) 104 mainly provides user plane functions, and the MME 103 and the SGW 104 may be in the same physical entity. A Packet Data Network Gateway (PGW) 105 is responsible for functions such as charging and lawful interception, and may also be in the same physical entity as the SGW 104. A Policy and Charging Rules Function Entity (PCRF) 106 provides Quality of Service (QoS) policies and charging criteria. A general Service GPRS Supporting Node (SGSN) 108 is a network node device that provides routing for data transfer in a Universal Mobile Telecommunication System (UMTS). A Home Subscriber Server (HSS) 109 is a home subsystem of the UE, and is responsible for protecting user information including current location of the UE, address of a serving node, user security information, and packet data context of the UE.

In order to better explain and understand the solutions provided by the embodiments of the preset disclosure, the principle of a wireless communication system to which the embodiments of the disclosure are applicable is briefly described below with reference to FIGS. 2, 3A, 3B, and 4. It should be noted that the following discussed FIGS. 2, 3A, 3B, and 4 and various alternative embodiments used to describe the principles disclosed in the disclosure are for illustration only, and should not be construed as limiting the scope of the disclosure in any way. Those skilled in the art will understand that the principles of the disclosure can be implemented in any suitably arranged system or device, that is, the solutions provided by the embodiments of the disclosure can be applied to a variety of wireless communication systems, including but not limited to NR systems, LTE systems, etc.

Figure 2:
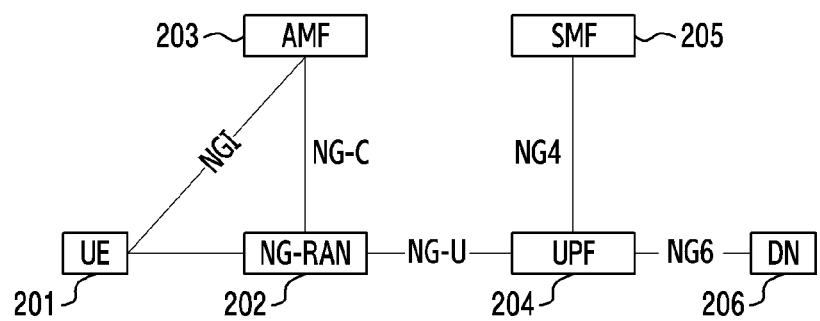
FIG. 2 is a schematic architecture diagram of a communication system according to an embodiment of the disclosure.

FIG. 2 shows a schematic structural diagram of a system architecture according to an embodiment of the disclosure. A system that can use the system architecture or a modified structure thereof also belongs to the system architecture applicable to the embodiments of the disclosure.

Referring to FIG. 2, user equipment, i.e. UE 201, is terminal equipment used to receive data and/or send data. A Next Generation Radio Access Network (NG-RAN) 202 is a radio access network, which includes a base station (gNB, or eNB connected to a 5G Core (5GC), the eNB connected to the 5GC is also called ng-gNB) that provides a wireless network interface for the UE. An Access and Mobility Management Function (AMF) 203 is responsible for managing mobility context and security information of the UE. A User Plane Function (UPF) 204 mainly provides user plane functions. A Session Management Function (SMF) 205 is responsible for session management. A Data Network (DN) 206 includes services of an operator, Internet access, services of a third party, etc. Communication interfaces between the entities are Next Generation (NG) interfaces. As shown in FIG. 2, an NG1 interface is between the UE and the AMF, an NG-U interface is between the NG-RAN and the UPF, an NG-C interface is between the RAN and the AMF, an NG4 interface is between the UPF and the SMF, and an NG6 interface is between the UPF and the DN.

Figure 3A:
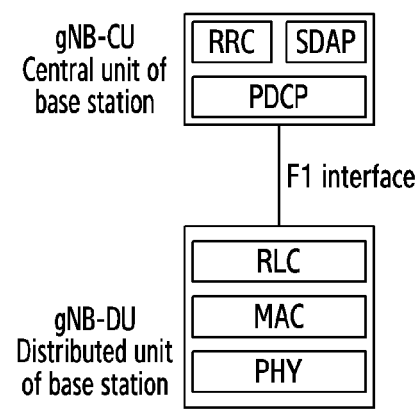
FIGS. 3A and 3B are schematic structural diagrams of a base station according to various embodiments of the disclosure.
Figure 3B:
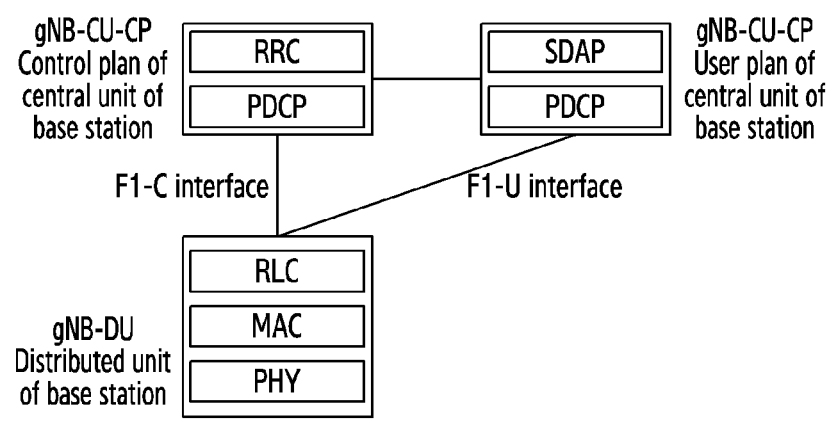

FIGS. 3A and 3B are schematic structural diagrams of a base station according to various embodiments of the disclosure.

Referring to FIGS. 3A and 3B, in the NR system, in order to support network function virtualization and more efficient resource management and scheduling, the base station (such as gNB) that provides a wireless network interface for the UE can be further divided into a gNB central unit (gNB-CU) and a gNB distributed unit (gNB-DU) (gNB-CU and gNB-DU are referred to as CU and DU respectively in the disclosure), as shown in FIG. 3A. The CU has a Radio Resource Control (RRC) layer, a Service Data Adaptation Protocol (SDAP) layer, a Packet Data Convergence Protocol (PDCP) layer, etc. The DU has a Radio Link Control (RLC) layer, a Media Access Control (MAC) layer, a Physical (PHY) layer, etc. A standardized public interface F1 is between the CU and the DU. As shown in FIG. 3B, the F1 interface is divided into a control plane F1-C interface and a user plane F1-U interface. A transmission network layer of the F1-C interface is based on Internet Protocol (IP) transmission. In order to transmit signaling more reliably, Stream Control Transmission Protocol (SCTP) is added to the IP. The protocol of an application layer is F1 Application Protocol (F1AP), see third generation partnership project (3GPP) TS38.473. The SCTP can provide reliable application layer message transmission. The transmission layer of F1-U is User Datagram Protocol (UDP)/IP, and a GPRS Tunnel Protocol-User (GTP-U) is used to carry a user plane Protocol Data Unit (PDU) over UDP/IP. Further, as shown in FIG. 3B, the gNB-CU may include a gNB-CU-Control Plane (gNB-CU-CP), which may also be referred to as a control plane entity of the central unit and a gNB-CU-User Plane (gNB-CU-UP), which may also be referred to as a user plane entity of the central unit), the gNB-CU-CP includes control plane functions of the base station and has RRC and PDCP layers, and the gNB-CU-UP includes user plane functions of the base station and has SDAP and PDCP layers. A standardized public interface E1, i.e. interface E1 shown in the figure, is between the gNB-CU-CP and the gNB-CU-UP, the protocol is E1 Application Protocol (E1AP), see 3GPP TS38.463. The interface between the control plane of the central unit of the base station and the distributed unit of the base station is an F1-C interface, that is, a control plane interface of F1. The interface between the user plane of the central unit of the base station and the distributed unit of the base station is an F1-U interface, that is, a user interface of F1.

In a New Radio (NR) access network, two UEs can perform data through a sidelink, and then a user can also communicate with the base station. In order to expand the coverage of the base station and improve the performance of user data transfer, the UE may also be allowed to access the network through other UE. This technology is sidelink relay technology.

Normally, a UE communicates via a direct link of a base station. However, with the increase of users and the increase of cell frequency, the coverage of the cell is limited, and the data transfer rate that the cell can provide is also limited. The sidelink relay technology is proposed to solve this problem, that is, the base station communicates with the UE through a relay terminal.

In the communication process, the relay terminal needs to send data from the UE to the base station, and also needs to send the data from the base station to the correct UE. In order to realize this function, the relay terminal needs to process user data, so as to establish a connection between the UE and the base station and then perform communication between the UE and the base station.

Figure 4:
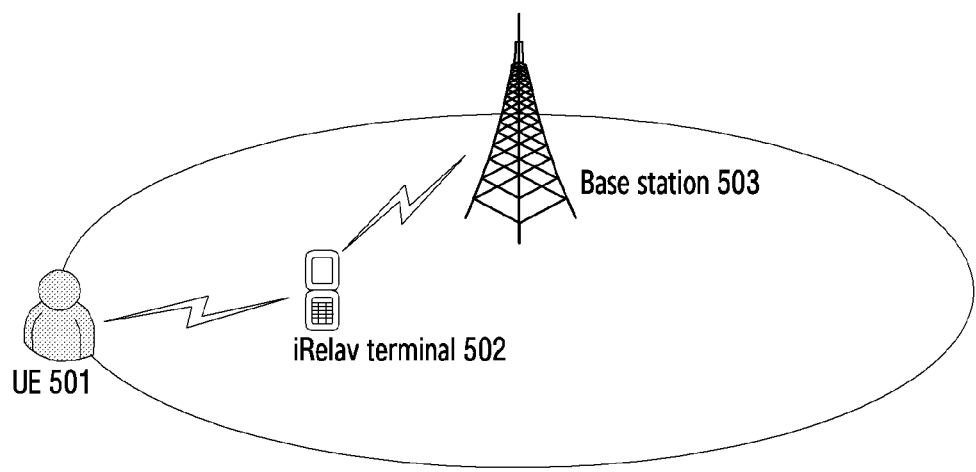
FIG. 4 is a schematic diagram of a sidelink relay according to an embodiment of the disclosure.

FIG. 4 is a schematic diagram of a sidelink relay according to an embodiment of the disclosure.

Referring to FIG. 4, in order to improve cell coverage and user throughput, the NR system proposes a sidelink relay technology. In this technology, as shown in FIG. 4, user equipment (UE) 501 communicates with a base station 503 through a relay terminal (Relay UE) 502. In order to realize this technology, the UE 501 needs to establish a connection with the base station 503 through the relay terminal 502. After the connection is established, the data transmission and reception of the UE 501 requires to go through the relay terminal 502, then the relay terminal 502 needs to be able to distinguish the data of different UEs and send the data to the correct UE, or send the data to the base station 503 through configured resources.

To make the objectives, technical solutions, and advantages of the disclosure clearer, the following further describes the embodiments of the disclosure in detail with reference to the accompanying drawings.

The following first provides some assumptions and some definitions of the disclosure.

The message names in the disclosure are only examples, and other message names can also be used.

The "first", "second", etc. included in the message names of the disclosure are just examples of messages, and do not represent the order of execution.

Detailed descriptions of steps irrelevant to the disclosure are omitted in the disclosure.

In the disclosure, the steps in each process can be executed in combination with each other, or can be executed alone. The execution steps of each process are just examples, and other possible execution sequences are not excluded.

In the disclosure, the base station may be a 5G base station (such as gNB), or a 4G base station (such as eNB), or other types of access nodes.

In the disclosure, the transfer of data refers to the receiving or sending of data.

The disclosure may involve identification information of a user below:

User identification information of a link: this information is used to identify a user who performs data communication through a link. One embodiment of the link is a PC5 link or a sidelink, and the identification may be referred to as a PC5 UE ID. In an embodiment, this link is a PC5 link or a sidelink used for data transfer between the user and the relay terminal. Another embodiment of the link is an air interface link, that is, a link between the user equipment and the base station or the distributed units of the base station, and the identification may be referred to as a Uu UE ID. In an embodiment, the Uu UE ID may be Cell-Radio Network Temporary Identifier (C-RNTI).

Identification information of a remote user: this information is used to identify a user who transfers data through the relay terminal, such as a Remote UE ID. Specifically, when a user transfers data through the relay terminal, the data of the user is sent to the base station through the relay terminal, or the base station sends data to the user through the relay terminal. The identification information is used to identify the user. The identification information may be allocated by the relay terminal, the distributed unit of the base station, the central unit of the base station (or the control plane of the central unit), or the base station.

Nodes involved in the disclosure are:

First node: a user who accesses a network through a relay terminal, such as a remote UE.

Second node: a relay terminal, such as a relay UE, through which the first node performs data transfer with the base station.

Third node: a distributed unit of the base station, the second node sends the data of the first node to the third node, or the second node sends the data of the third node to the first node.

Fourth node: a central unit of the base station, or a control plane of the central unit of the base station, or a user plane of the central unit of the base station.

It should be noted that the third node and the fourth node constitute a base station serving the first node, and also constitute a base station performing data transfer with the second node.

When the central unit of the base station includes a control plane and a user plane, the following nodes are also involved:

Fifth node: a control plane of the central unit of the base station.

Sixth node: a user plane of the central unit of the base station.

In the disclosure, the SRB0 RRC message may be an RRC message carried by SRB0 as defined in 3GPP T38.331 and/or TS36.331, such as RRCSetupRequest, RRCResumeRequest, RRCReestablishmentRequest, RRCSystemInfoRequest, RRCSetup, and RRCReject. The SRB1 RRC message may be an RRC message carried by SRB1 as defined in 3GPP T38.331 and/or TS36.331, such as RRCResume, RRCReestablishment, RRCRelease, and RRCReconfiguration. The SRB2 RRC messages may be an RRC message carried by SRB2 as defined in 3GPP T38.331 and/or TS36.331, such as DLInformationTransfer.

Based on the above introduction of nodes, the meanings of the above "user identification information of a link" and "identification information of a remote user" are as follows:

User identification information of a link: In an embodiment, the identification information identifies a first node on the link. Further, the identification information distinguishes different first nodes, that is, for different first nodes, the "user identification information of a link" will also be different. In an embodiment, when the second node sends data (such as a data packet of an RRC message belonging to the SRB, or a data packet belonging to the DRB, the data will eventually be sent to the fourth node by the third node) of the first node to the third node, the second node adds the identification information to the data packet for the third node to identify the first node to which the data packet belongs, or when the third node sends data (the data is sent to the third node by the fourth node) of the first node to the second node, the third node adds the identification information to the data packet for the second node to identify the first node to which the data packet belongs. The name of the identification may be user identification information of a temporary link, user identification information of a local link, or other names.

Identification information of a remote user (or referred to as local identification information of a remote user, or temporary identification information of a remote user).

In an embodiment, the information identifies a first node. Further, the identification information distinguishes different first nodes, that is, for different first nodes, the "user identification information of a remote user" will also be different. In an embodiment, when the second node sends data (such as a data packet of an RRC message belonging to the SRB, or a data packet belonging to the DRB, the data will eventually be sent to the fourth node by the third node) of the first node to the third node, the second node adds the identification information to the data packet for the third node to identify the first node to which the data packet belongs, or when the third node sends data (the data is sent to the third node by the fourth node) of the first node to the second node, the third node adds the identification information to the data packet for the second node to identify the first node to which the data packet belongs. The name of the identification may be identification information of a temporary remote user, user local identification information of a remote user, or other names.

In addition, the disclosure further includes the following identification information:

General user identification information of a link (or default user identification information of a link). In an embodiment, the identification information is used to send the SRB0 RRC message of the first node. Different first nodes have different identification information. In another embodiment, the identification information may be shared by different first nodes, that is, the identification information is applicable to a plurality of or all first nodes that access the second node. In an embodiment, the identification information may be allocated by the second node. In another embodiment, the identification information may be allocated by the third or fourth node. Specifically, when a first node accesses the fourth node through the second node (for example, the SRB0 RRC message of the first node is sent to the fourth node through the second node and the third node in sequence, or the fourth node sends the SRB0 RRC message to the first node through the third node and the second node in sequence), because the fourth node or the third node has not allocated a piece of specific identification information to the first node, the general user identification information of the link (or the default user identification information of the link) can be used to identify the first node, for example, when the second node sends the SRB0 RRC message of the first node to the third node or the third node sends the SRB0 RRC message of the first node to the second node, the identification information can be carried, so as to determine that the transmitted or received message is for the first node.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. Different first nodes have different identification information. In another embodiment, the identification information may be shared by different first nodes, that is, the identification information is applicable to a plurality of or all first nodes that access the second node. In an embodiment, the identification information may be allocated by the second node. In another embodiment, the identification information may be allocated by the third or fourth node. Specifically, when a first node accesses the fourth node through the second node (for example, the SRB0 RRC message of the first node is sent to the fourth node through the second node and the third node in sequence, or the fourth node sends the SRB0 RRC message to the first node through the third node and the second node in sequence), because the fourth node or the third node has not allocated a piece of specific identification information to the first node, the identification information can be used to identify the first node, for example, when the second node sends the SRB0 RRC message of the first node to the third node or the third node sends the SRB0 RRC message of the first node to the second node, the identification information can be carried, so as to determine that the transmitted or received message is for the first node.

It should be noted that in the disclosure, the "general user identification information of a link (or default user identification information of a link)" is different from the "user identification information of a link", and the "general identification information of a remote user (or default identification information of a remote user, or general local identification information of a remote user, or default local identification information of a remote user, or general temporary identification information of a remote user, or default temporary identification information of a remote user)" is different from the "identification information of a remote user (or referred to as local identification information of a remote user, or temporary identification information of a remote user)".

The "user identification information of a link", "identification information of a remote user", "general user identification information of a link", and "general identification information of a remote user" may uniquely identify a remote user (first node) in a base station or a central unit (fourth node) of a base station, or uniquely identify a remote user (first node) in a cell, or uniquely identify a remote user (first node) in a distributed unit (third node) of a base station, or uniquely identify a remote user (first node) in a relay terminal (second node). The identification information may be allocated by the central unit of the base station, or by the distributed unit of the base station. The following process will introduce the method of allocating the aforementioned identification information.

The disclosure involves the following two links:

Air interface link: this link is a link between the second node and the third node (or the base station), and may also be referred to as a Uu link.

Sidelink: this link is a link between the first node and the second node, and may also be referred to as a PC5 link. The following describes the alternative embodiments of the disclosure from three aspects. The steps in the three aspects can be executed in combination with each other, or can be executed alone. The execution steps in the three aspects are just examples, and other possible execution orders are not excluded.

First aspect of the disclosure: user equipment accesses a network through a relay terminal.

In order to implement Sidelink relay, a user needs to access a network through a relay UE, that is, the user needs to interact with a base station by a message required for connection setup through a relay terminal. The technical problem involved in the first aspect is how to implement a connection between a user and a base station through a relay terminal.

Figure 5:
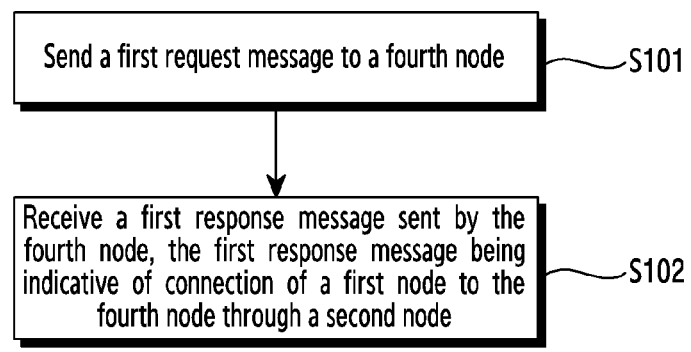
FIG. 5 is a schematic flowchart of data transfer according to an embodiment of the disclosure.

FIG. 5 is a schematic flowchart of data transfer according to an embodiment of the disclosure.

Referring to FIG. 5, an embodiment of the disclosure provides a method executed by a third node. The method includes:

At step S101, a first request message is sent to a fourth node.

In an embodiment, the first request message includes at least one of the following:
- user identification information of an F1 interface, the user identification information of the F1 interface being used to identify at least one of a first node and a second node;
- first identification information of the first node, the first identification information being used to identify the first node on a link;
- second identification information of the first node;
- identification information of the second node;
- a first container, the first container including a third request message sent by the first node;
- a second container, the second container including at least one of the third request message sent by the first node, the first identification information, and the second identification information;
- third identification information of the first node, the identification information being general (or default) user identification information of a link;
- fourth identification information of the first node, the identification information being general (or default) identification information of a remote user; and
- first indication information of the first node.

At step S102, a first response message sent by the fourth node is received, the first response message being indicative of connection of the first node to the fourth node through the second node.

In an embodiment, the first response message includes at least one of the following:
- user identification information of the F1 interface, the user identification information of the F1 interface being used to identify at least one of the first node and the second node;
- first identification information of the first node, the first identification information being used to identify the first node on the link;
- second identification information of the first node;
- identification information of the second node; and
- a third container, the third container including a response message in response to the third request message sent by the first node.

In an embodiment, before sending a first request message to a fourth node, the method further includes:
- A second request message sent by the second node is received, the second request message includes the third request message sent by the first node to the second node;
- The third request message includes at least one of the following:
  - first identification information of the first node, the first identification information being used to identify the first node on the link; and
  - second identification information of the first node.

In an embodiment, the third request message is a connection setup request message sent by the first node.

In an embodiment, after a first response message sent by the fourth node is received, the method further includes:

A second response message is sent to the second node, so that the second node sends a third response message to the first node, wherein the third response message includes the response message in response to the third request message sent by the first node; and the second response message includes at least one of the following:
- first identification information of the first node, the first identification information being used to identify the first node on the link;
- second identification information of the first node;
- third identification information of the first node, the identification information is general (or default) user identification information of a link;
- fourth identification information of the first node, the identification information being general (or default) identification information of a remote user; and
- the response message in response to the third request message sent by the first node.

In an embodiment, fourth request information sent by the fourth node is received, the fourth request information being used to configure a resource used when the second node transfers data of the first node; and a fourth response message is sent to the fourth node, the fourth response message being used to transfer configuration information generated by the third node.

In an embodiment, the fourth request information includes at least one of the following:
- first identification information of the first node, the first identification information being used to identify the first node on the link;
- second identification information of the first node, the second identification information being used to identify the first node;
- third identification information of the first node, the third identification information being general (or default) user identification information of a link;
- fourth identification information of the first node, the fourth identification information being general (or default) identification information of a remote user; and
- information about a bearer or resource, the bearer being used to transfer data of the first node;
- the information about a bearer or resource includes at least one of the following:
- identification information of the bearer or identification information of the resource;
- QoS parameter information of the bearer or QoS parameter information of the resource;
- indication information of a default bearer (or a default RLC bearer) or indication information of a resource (such as a default RLC channel);
- indication information for setting up the default bearer or the resource; and
- indication information of a user to which the data of the first node belongs.

In an embodiment, the fourth response message includes at least one of the following:
- configuration information of a radio link control (RLC) layer;
- configuration information of a logical channel;
- first identification information of the first node, the first identification information being used to identify the first node on the link;

second identification information of the first node, the second user identification information being used to identify the first node; and first default configuration information or first general configuration information.

In an embodiment, the first configuration message includes at least one of the following:

identification information of a user served by the second node;

configuration information of an air interface link, the air interface link being a link between the second node and the third node; and second default configuration information or second general configuration information.

The technical solution provided by the embodiment of the disclosure has at least the following beneficial effects:

A connection is established between the first node and the fourth node through the second node.

Figure 6:
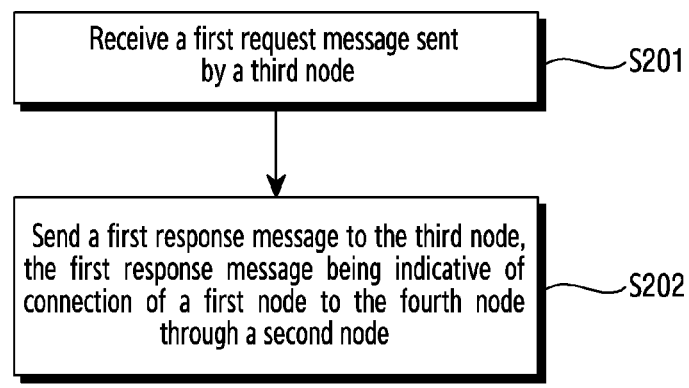
FIG. 6 is a schematic flowchart of data transfer according to an embodiment of the disclosure.

FIG. 6 is a schematic flowchart of data transfer according to an embodiment of the disclosure.

Referring to FIG. 6, an embodiment of the disclosure provides a method executed by a fourth node. The method includes:

At step S201, a first request message sent by a third node is received.

At step S202, a first response message is sent to the third node, the first response message being indicative of connection of a first node to the fourth node through a second node.

In an embodiment, a first configuration message is sent to the second node, the first configuration message being used to configure data transfer between the second node and other first nodes except the first node.

The technical solution provided by the embodiment of the disclosure has at least the following beneficial effects:

A connection is established between the first node and the fourth node through the second node.

Figure 7:
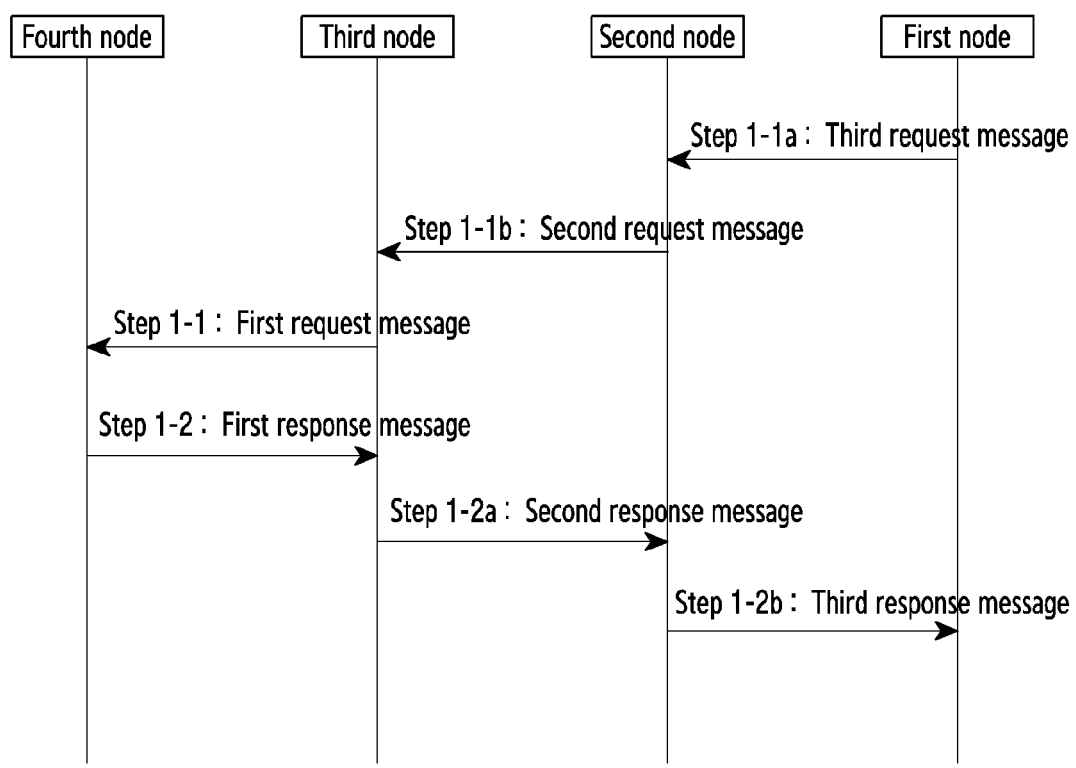
FIG. 7 is a schematic flowchart of user equipment access according to an embodiment of the disclosure.

FIG. 7 is a schematic flowchart of user equipment access according to an embodiment of the disclosure.

Referring to FIG. 7, in an embodiment of the disclosure, a user accessing a network through a relay terminal includes the following steps:

At step 1-1, the third node sends a first request message to the fourth node. The message is used to send information related to the first node or the second node to the fourth node. The first request message includes at least one of the following information:

User identification information of an F1 interface, such as gNB-CU UE F1AP ID, and/or gNB-DU UE F1AP ID. In an embodiment, the identification information is used to identify the first node. In another embodiment, the identification information is used to identify the second node.

User identification information of a link. In an embodiment, the identification information identifies the first node on the link. In an embodiment, the identification information may be allocated to the first node by the third node or the fourth node. Specifically, when the third node receives a data packet from the second node (before step 1-1), the third node can learn that the data packet is a data packet belonging to the first node (for example, learn through the configuration of a resource used to transfer the data packet (such as the configuration included in step 1-1-3 below), or learn through the information included in the data packet (such as the identification information included)), and then the third node allocates the identification information to the first node.

Identification information of a remote user. In an embodiment, the information identifies the first node. In an embodiment, the identification information may be allocated to the first node by the third node or the fourth node. Specifically, when the third node receives a data packet from the second node (before step 1-1), the third node can learn that the data packet is a data packet belonging to the first node (for example, learn through the configuration of a resource used to transfer the data packet (such as the configuration included in step 1-1-3 below), or learn through the information included in the data packet (such as the identification information included)), and then the third node allocates the identification information to the first node.

A first container. The first container contains a connection setup request message (such as an RRC message) of the first node. The "connection setup request message of the first node" is a message sent by the first node to request the setup of a connection with the fourth node. In an example, the connection setup request message may be RRCSetupRequest, or RRCResumeRequest, or RRCReestablishmentRequest in TS38.331, or it may also be RRCConnectionSetupRequest, or RRCConnectionResumeRequest, or RRCConnectionReestablishmentRequest in TS36.331. Further, the "connection setup request message of the first node" may further include the user identification information of the link, or the identification information of the remote user, and the identification information is identification information about the first node.

A second container. This container contains a message (such as an RRC message) sent by the second node, the message includes a message sent by the first node. This container includes at least one of the following information:

A connection setup request message of the first node. The "connection setup request message of the first node" is a message sent by the first node to request the setup of a connection with the fourth node. In an example, the connection setup request message may be RRCSetupRequest, or RRCResumeRequest, or RRCReestablishmentRequest in TS38.331, or it may also be RRCConnectionSetupRequest, or RRCConnectionResumeRequest, or RRCConnectionReestablishmentRequest in TS36.331. Further, the "connection setup request message of the first node" may further include the user identification information of the link, or the identification information of the remote user, and the identification information is identification information about the first node.

User identification information of a link. In an embodiment, the identification information is identification information about the first node.

Identification information of a remote user. In an embodiment, the identification information is identification information about the first node.

Identification information of a relay terminal. The information is used to identify the relay terminal to which the user (the first node) is connected. The user (the first node) communicates with the base station through the relay terminal. In an embodiment, the relay terminal may be the aforementioned second node. An example of the identification information is C-RNTI, and another example is identification information of the relay terminal on the distributed unit side of the F1 interface and/or identification information of the relay terminal on the central unit side of the F1 interface (gNB-DU UE F1AP ID, and/or gNB-CU UE F1AP ID).

First temporary identification information. The identification information is information used to temporarily identify the first node. In an embodiment, this information is information included in a data packet from the second node that is received by the third node before step 1-1 (in an embodiment, the information is included in a header of the data packet). Further, in an embodiment, the first temporary identification information may be allocated by the second node. In another embodiment, the first temporary identification information is sent by the fourth node to the second node before step 1-1. Further, in this embodiment, the first temporary identification information may be equivalent to the aforementioned "user identification information of a link" or "identification information of a remote user."

General user identification information of a link (or default user identification information of a link). In an embodiment, the identification information is used to send an SRB0 RRC message of the first node. The specific meaning of the identification information may refer to the above description of the disclosure. In an embodiment, this identification information is included in a data packet received by the third node (for example, a data packet belonging to the first node that is sent by the second node to the third node before step 1-1). In another embodiment, after receiving the identification information, the fourth node can implicitly learn the second node connected by the first node. Specifically, before the first node accesses the second node, the fourth node has configured the identification information to the second node (the configuration method may refer to step 1-1-3 below), thereby allowing the identification information to be included in the data packet when the second node sends the data packet of the first node.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. In an embodiment, the identification information is included in a data packet received by the third node (for example, a data packet belonging to the first node that is sent by the second node to the third node before step 1-1). In another embodiment, after receiving the identification information, the fourth node can implicitly learn the second node connected to the first node. Specifically, before the first node accesses the second node, the fourth node has configured the identification information to the second node (the configuration method may refer to step 1-1-3 below), thereby allowing the identification information to be included in the data packet when the second node sends the data packet of the first node.

First indication information. The function of the information is to inform the fourth node whether the first node is allowed to access. The indication information may include one of the following information:

First configuration information. The information is configuration information generated by the third node, such as CellGroupConfig information (in an embodiment, the information includes at least the configuration of SRB1), or DU to CU RRC Container information. Specifically, if the first configuration information is sent to the fourth node, it implicitly indicates that the third node allows the access of the first node. In addition, after receiving the configuration information, the fourth node may not send the configuration information to the first node. Specifically, when the fourth node learns that the first node accesses the network through the second node (for example, learns from one or more pieces of information included in the first request message), even if the fourth node receives the first configuration information, the fourth node will not send the configuration information to the first node. This is different from the prior art. In the prior art, if the fourth node receives the first configuration information, the fourth node will send, to the first node, the first configuration information included in an RRC message sent to the first node.

Configuration information of a first sidelink. The information is configuration information generated by the third node. The information includes configuration information (such as an RLC layer, a logical channel, an MAC layer, or a physical layer) required when the first node transfers data on the sidelink. In an embodiment, the configuration information includes at least configuration information required when an SRB1 RRC message is transferred on a sidelink (such as a sidelink between the first node and the second node). Further, the information is given for an RLC bearer/channel that transfers the SRB1 RRC message on the sidelink. In addition, the information may also implicitly indicate that the third node allows the access of the first node.

Indication information of allowing access. The information is used to notify the fourth node that the third node allows the access of the first node.

In an embodiment, the "first request message" may be a message for the first node, such as INITIAL UL RRC MESSAGE TRANSFER in TS38.473. In another embodiment, the "first request message" may be a message for the second node, such as UL RRC MESSAGE TRANSFER in TS38.473. Further, through step 1-1 above, the fourth node can learn that the first node accesses the network through the second node.

At step 1-2, the fourth node sends a first response message to the third node. The message is used to respond to the connection setup request of the first node. The first response message includes at least one of the following information:

User identification information of an F1 interface, such as gNB-CU UE F1AP ID, and/or gNB-DU UE F1AP ID. In an embodiment, the identification information is used to identify the first node. In another embodiment, the identification information is used to identify the second node.

User identification information of a link. In an embodiment, the identification information identifies the first node on the link. In an embodiment, the identification information is allocated by the fourth node, and it will be used when the first node sends a data packet through the second node (for example, added to the data packet), or used when the third node sends a data packet of the first node through the second node. Specifically, when the fourth node learns according to the first request message that the first node accesses the network through the second node, the fourth node will allocate the identification information to the first node.

Further, the fourth node learns, through the "first temporary identification information" or "general user identification information of a link" or "general identification information of a remote user" received in step 1-1, that the first node is a new node accessed through the second node, and then allocates the "user identification information of a link" to the first node. In another embodiment, if the "first response message" includes the information, the information is not included in step 1-1.

Identification information of a remote user. In an embodiment, the information identifies the first node. In an embodiment, the identification information is allocated by the fourth node, and it will be used when the first node sends a data packet through the second node (for example, added to the data packet), or used when the third node sends a data packet of the first node through the second node. Specifically, when the fourth node learns according to the first request message that the first node accesses the network through the second node, the fourth node will allocate the identification information to the first node. Further, the fourth node learns, through the "first temporary identification information" or "general user identification information of a link" or "general identification information of a remote user" received in step 1-1, that the first node is a new node accessed through the second node, and then allocates the "user identification information of a link" to the first node. In another embodiment, if the "first response message" includes the information, the information is not included in step 1-1.

Identification information of a relay terminal. The information is used to identify the relay terminal to which the user (the first node) is connected. The user (the first node) communicates with the base station through the relay terminal. In an embodiment, the relay terminal may be the aforementioned second node. An example of the identification information is C-RNTI, and another example is identification information of the relay terminal on the distributed unit side of the F1 interface and/or identification information of the relay terminal on the central unit side of the F1 interface (gNB-DU UE F1AP ID, and/or gNB-CU UE F1AP ID).

A third container. The container includes a message in response to the "connection setup request message of a first node", and the message is ultimately sent to the first node. The message may be radio resource control setup RRCSetup, or radio resource control resume RRCResume, or radio resource control reestablishment RRCReestablishment in TS38.331, or it may also be radio resource control connection setup RRCConnectionSetup, or radio resource control connection resume RRCConnectionResume, or radio resource control connection reestablishment RRCConnectionReestablishment in TS36.331. The message in response to the "connection setup request message of a first node" may include one of the following information:

First configuration information. The information is sent to the fourth node in step 1-1 above. See the above "first indication information."

Configuration information of a first sidelink. The information is sent to the fourth node in step 1-1 above. See the above "first indication information". User identification information of a link. In an embodiment, the identification information identifies the first node on the link.

Identification information of a remote user. In an embodiment, the information identifies the first node.

Ninth data identification information. In an embodiment, the identification information indicates the SRB1 RRC message. Further, the identification information is identification information different from the SRB ID, such as an adaptation layer bearer ID. In an embodiment, the identification information is the SRB ID.

Indication information of a resource bearing user data. The information indicates the resource used to transfer data (such as data of the first node, such as the SRB1 RRC message of the first node), and the resource is a resource on the sidelink between the first node and the second node. In an embodiment, the resource may be a channel (such as an RLC channel) on a sidelink, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer on an air interface link, and the indication information is identification information of the RLC bearer (such as RLC bearer ID, ingress RLC bearer ID, or egress RLC bearer ID).

Indication information of a data type. The information indicates the type of data carried by the resource indicated by the "indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Fifth adaptation layer information. The information indicates information in a data packet. In an embodiment, the information is information that needs to be added when the first node sends or receives the data packet. In another embodiment, the information is information included when the first node sends or receives the SRB1 RRC message. The information includes at least one of the following information:

User identification information of a link. In an embodiment, the identification information identifies the first node on the link.

Identification information of a remote user. In an embodiment, the information identifies the first node.

Indication information of a data type, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Identification information of a radio bearer, such as signaling radio bearer SRB ID, or data radio bearer DRB ID.

Tenth data identification information. The information indicates different types of data transferred by the first node (such as data sent by the first node to the second node), such as SRB1 data. The identification information is allocated by the fourth node or the third node. In an embodiment, the "first data identification information" may be different from the "first identification information of user data", or may be different from the "identification information of a radio bearer", such as adaptation layer bearer ID.

User identification information of an F1 interface, such as gNB-CU UE F1AP ID, and/or gNB-DU UE F1AP ID. In an embodiment, the information identifies the first node.

In an embodiment, the following steps may be further included before step 1-1:

At step 1-1a, the first node sends a third request message to the second node. The function of the message is that the first node requests to set up a connection with the fourth node. In an embodiment, the third request message is the "a connection setup request message of the first node", including information RRCSetupRequest, or RRCResumeRequest, or RRCReestablishmentRequest in TS38.331, or RRCConnectionSetupRequest, or RRCConnectionResumeRequest, or RRCConnectionReestablishmentRequest in TS36.331. Further, the message may also include at least one of the following information:

User identification information of a link. In an embodiment, the identification information identifies the first node on the link.

Identification information of a remote user. In an embodiment, the information identifies the first node.

Adaptation layer bearer ID.

At step 1-1b, the second node sends a second request message to the third node. The message is used to transfer the third request message received in step 1-1a. The second request message includes at least one of the following information:

The aforementioned third request message, that is, the third request message included in step 1-1a.

User identification information of a link. In an embodiment, the identification information identifies the first node on the link.

Identification information of a remote user. In an embodiment, the information identifies the first node.

First temporary identification information. The identification information is information used to temporarily identify the first node. In an embodiment, the information is allocated by the second node. In another embodiment, the information is sent by the fourth node to the second node before this step. Further, this information may be equivalent to the "first temporary identification information" carried in step 1-1 above.

General user identification information of a link (or default user identification information of a link). In an embodiment, the identification information is used to send an SRB0 RRC message of the first node. The specific meaning of the identification information may refer to the above description of the disclosure. In an embodiment, the identification information may be allocated by the second node. In another embodiment, the identification information may be pre-allocated by the third or fourth node.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. The specific meaning of the identification information may refer to the above description of the disclosure. In an embodiment, the identification information may be allocated by the second node. In another embodiment, the identification information may be pre-allocated by the third or fourth node.

Adaptation layer bearer ID.

In an embodiment, the second request message may be the third request message sent in step 1-1a, that is, the second node forwards the third request message received from the first node to the third node. In another embodiment, the second request message is a message generated by the second node (such as an RRC message generated by the second node. As an example, the RRC message may be an existing RRC message. As another embodiment, the RRC message may be a newly defined RRC message, such as uplink sidelink relay message ULSidelinkRelayMessage). The message is used to transfer the message of the first node. In addition to the third request message sent by the first node, the message may further include user identification information of a link for identifying the first node, or identification information of a remote user. In another embodiment, the second request message may be a data packet including the third request message. The data packet includes a header (such as an adaptation header). The header includes user identification information of a link for identifying the first node, or identification information of a remote user, or general user identification information of a link (or default user identification information of a link), or general identification information of a remote user (or default identification information of a remote user, or general local identification information of a remote user, or default local identification information of a remote user, or general temporary identification information of a remote user, or default temporary identification information of a remote user), or first temporary identification information.

The aforementioned third request message may be sent through a default configuration on a sidelink (a link between the first node and the second node), or sent through a specific configuration on the sidelink. The default configuration or specific configuration may be configured for a bearer or channel (such as an RLC bearer, or an RLC channel). The default configuration or specific configuration includes at least one of the following configurations: an RLC layer configuration, a logical channel configuration, an MAC layer configuration, and a physical layer configuration. The aforementioned default configuration or specific configuration on the sidelink may be a configuration of the first node by the second node, or a configuration of the first node by the fourth node, or may be pre-configured.

The aforementioned second request message may be sent through a default configuration on an air interface link between the second node and the third node, or sent through a specific configuration on the air interface link between the second node and the third node. The default configuration or specific configuration may be configured for a bearer or channel (such as an RLC bearer, or an RLC channel). The default configuration or specific configuration includes at least one of the following configurations: an RLC layer configuration, a logical channel configuration, an MAC layer configuration, and a physical layer configuration. The aforementioned default configuration or specific configuration on the air interface link may be a configuration of the second node by the fourth node (as described in step 1-1-3 below). In an embodiment, after step 1-2, the method further includes:

At step 1-2a, the third node sends a second response message to the second node. The message includes a message that the fourth node responds to the connection setup request of the first node, for example, responds to the "connection setup request message of the first node" (such as RRCSetup, RRCResume, or RRCReestablishment message). Further, the message may include at least one of the following information:

User identification information of a link. In an embodiment, the identification information identifies the first node on the link.

Identification information of a remote user. In an embodiment, the information identifies the first node.

General user identification information of a link (or default user identification information of a link). In an embodiment, the identification information is used to send an SRB0 RRC message of the first node. The specific meaning of the identification information may refer to the above description of the disclosure.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. The specific meaning of the identification information may refer to the above description of the disclosure.

First temporary identification information.

First configuration information.

A first configuration information of sidelink.

Ninth data identification information.

Indication information of a resource bearing user data.

Fifth adaptation layer information.

The information included in the message may refer to the description of the "third container" in step 1-2 above.

In an embodiment, the second response message is a message sent to the second node (such as an RRC message sent to the second node. As an example, the RRC message may be an existing RRC message. As another embodiment, the RRC message may be a newly defined RRC message, such as a downlink sidelink relay message DLSidelinkRelayMessage). The message is used to transfer a message in response to the "connection setup request message of the first node". The message may further include user identification information of a sidelink for identifying the first node, or identification information of a remote user. In another embodiment, the second response message may be a data packet including the message in response to the "connection setup request message of the first node". The data packet includes a header (such as an adaptation header). The header includes user identification information of a sidelink for identifying the first node, or identification information of a remote user, or general user identification information of a link (or default user identification information of a link), or general identification information of a remote user (or default identification information of a remote user, or general local identification information of a remote user, or default local identification information of a remote user, or general temporary identification information of a remote user, or default temporary identification information of a remote user), or first temporary identification information.

In another embodiment, when the third node sends the second response message in step 1-2a, the information that can be added to the header of the data packet can be the same as the information included in the data packet received in step 1-1b. In another embodiment, if step 1-2a includes the SRB0 RRC message (such as RRCSetup, RRCReject), it may include general user identification information of a link (or default user identification information of a link), or general identification information of a remote user (or default identification information of a remote user, or general local identification information of a remote user, or default local identification information of a remote user, or general temporary identification information of a remote user, or default temporary identification information of a remote user), or first temporary identification information. In another embodiment, if step 1-2a includes the SRB1 RRC message (such as RRCResume, or RRCReestablishment), it may include general user identification information of a link (or default user identification information of a link), or general identification information of a remote user (or default identification information of a remote user, or general local identification information of a remote user, or default local identification information of a remote user, or general temporary identification information of a remote user, or default temporary identification information of a remote user), or first temporary identification information. In another embodiment, if step 1-2a includes the SRB1 RRC message (such as RRCResume, or RRCReestablishment), it may include user identification information of a link or identification information of a remote user (or local identification information of a remote user, or temporary identification of a remote user).

The aforementioned second response message may be sent through a default configuration on an air interface link between the second node and the third node, or sent through a specific configuration on the air interface link between the second node and the third node. The default configuration or specific configuration may be configured for a bearer or channel (such as an RLC bearer, or an RLC channel). The default configuration or specific configuration includes at least one of the following configurations: an RLC layer configuration, a logical channel configuration, an MAC layer configuration, and a physical layer configuration. The default configuration or specific configuration may be a configuration of the second node by the fourth node (such as step 1-1-3 below), or may be pre-configured.

At step 1-2b, the second node sends a third response message to the first node, the message includes a message in response to the "connection setup request message of the first node". The information included in the message may refer to the description of the "third container" in step 1-2 above.

The aforementioned third response message may be sent through a default configuration on a sidelink between the second node and the first node, or sent through a specific configuration on the sidelink between the second node and the first node. The default configuration or specific configuration may be configured for a bearer or channel (such as an RLC bearer, or an RLC channel). The default configuration or specific configuration includes at least one of the following configurations: an RLC layer configuration, a logical channel configuration, an MAC layer configuration, and a physical layer configuration. The aforementioned default configuration or specific configuration on the sidelink may be a configuration of the first node by the second node, or a configuration of the first node by the fourth node, or may be pre-configured.

The technical solution provided by the embodiment of the disclosure has at least the following beneficial effects:

(1) The fourth node can obtain the information of the first node and the second node connected to the first node, and the third node can obtain the information of the first node and the second node connected to the first node; further, after obtaining the information, the third node and the fourth node can configure the first node to transfer data through the second node.

(2) The first node can establish a connection with the fourth node through the second node, so that the first node can transfer data with the fourth node through the second node.

In an embodiment, the following steps are implemented through a process initiated by the first node:

In a Step, the first node sends a third request message to the second node. See step 1-1*a* above.

In a Step, the second node sends a second request message to the third node. See step 1-1*b* above.

In a Step, the third node sends a first request message to the fourth node. See step 1-1 above. The first request message is a message for the first node, such as an INITIAL UL RRC MESSAGE TRANSFER message.

In a Step, the fourth node sends a first response message to the third node. See step 1-2 above. The first response message is a message for the first node, such as a DL RRC MESSAGE TRANSFER message.

In a Step, the third node sends a second response message to the second node. See step 1-2*a* above.

In a Step, the second node sends a third response message to the first node. See step 1-2*b* above.

According to the above process, and according to the different methods that the fourth node configures the identification information of the first node to the second node (such as the "user identification information of a link", or "identification information of a remote user"), there may be several implementation ways below:

Way 1: when the fourth node configures the identification information of the first node to the second node before a step, the identification information of the first node included in the message sent in a step is the identification information of the first node configured by the fourth node to the second node (such as the "user identification information of a link", or "identification information of a remote user"), and the identification information of the first node configured by the fourth node to the second node may also be included in a step or another step.

Way 2: when the fourth node configures the identification information of the first node to the second node after a step (for example, between a step and another step), the identification information of the first node included in the message sent in a step is the "first temporary identification information" or "general user identification information of a link" or "general identification information of a remote user" mentioned in step 1-1 above, and the "first temporary identification information" may also be included in a step. Then a step may be included, that is, the fourth node sends, to the second node, the identification information of the first node (such as the "user identification information of a link", or "identification information of a remote user") and/or the "first temporary identification information", so that the second node can learn the identification information of the first node. Further, the identification information of the first node (such as the "user identification information of a link", or "identification information of a remote user") sent by the fourth node to the second node may also be included in a step or another step.

Way 3: when the fourth node configures the identification information of the first node to the second node after a step, the identification information of the first node included in the message sent in a step is the "first temporary identification information" or "general user identification information of a link" or "general identification information of a remote user" mentioned in step 1-1 above, and a step may also involve the "first temporary identification information" or "general user identification information of a link" or "general identification information of a remote user". Further, the "first temporary identification information" or "general user identification information of a link" or "general identification information of a remote user" is included in a step and/or another step.

In an embodiment, the following steps are implemented through a process initiated by the fourth node:

In a Step, the first node sends a third request message to the second node. See step 1-1*a* above.

In a Step, the second node sends a second request message to the third node. See step 1-1*b* above.

In a Step, the third node sends a first request message to the fourth node. See step 1-1 above. The first request message is a message for the second node, such as a UL RRC MESSAGE TRANSFER message.

In a Step, the fourth node sends a first response message to the third node. See step 1-2 above. The first response message is a message for the first node, such as a UE CONTEXT SETUP REQUEST message, or a DL RRC MESSAGE TRANSFER message. If the first response message is a UE CONTEXT SETUP REQUEST message, it may further include a UE CONTEXT SETUP RESPONSE message sent by the third node to the fourth node, and a DL RRC MESSAGE TRANSFER message sent by the fourth node to the third node.

In a Step, the third node sends a second response message to the second node. See step 1-2*a* above.

In a Step, the second node sends a third response message to the first node. See step 1-2*b* above.

Figure 8:
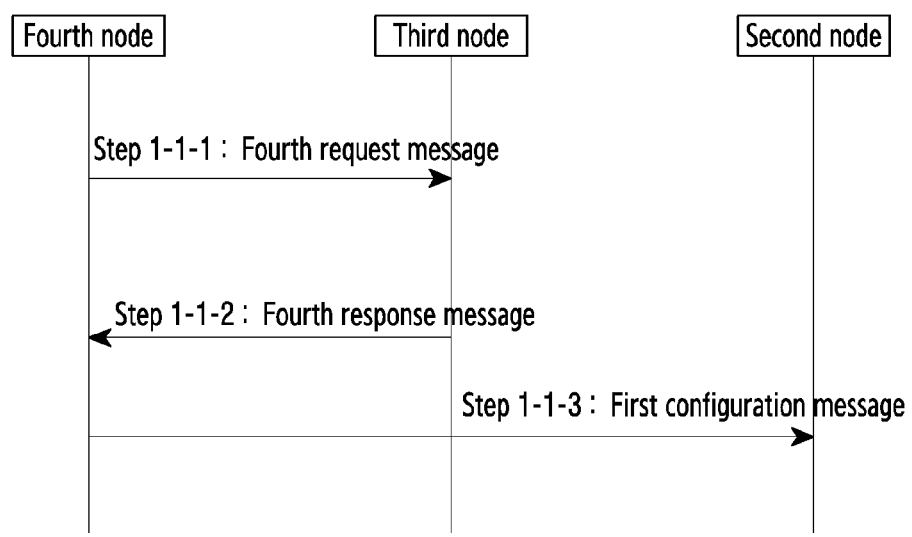
FIG. 8 is a schematic flowchart of resource configuration of a relay terminal according to an embodiment of the disclosure.

In addition, different from the communication between the user and the base station, the communication between the relay terminal and the base station is also used to complete the data transfer of other users. How to implement the transfer of other user data between the relay terminal and the base station is another problem that needs to be solved in the first aspect. In order to solve this problem, the base station needs to configure related resources for the relay terminal, so that the relay terminal can perform data transfer of other users on the configured resources. In an embodiment, the process involved in the resource configuration is shown in FIG. 8:

FIG. 8 is a schematic flowchart of resource configuration of a relay terminal according to an embodiment of the disclosure.

Referring to FIG. 8, at step 1-1-1, the fourth node sends a fourth request message to the third node. The message is used to configure a resource used when the second node transfers the data of the first node. Further, this step may be performed after the fourth node learns that the second node is a relay terminal. The message includes at least one of the following information:

User identification information of a link. In an embodiment, the identification information identifies the first node on the link. The specific meaning of the identification information may refer to the above description of the disclosure.

Identification information of a remote user (or referred to as local identification information of a remote user, or temporary identification information of a remote user). In an embodiment, the identification information identifies the first node. The specific meaning of the identification information may refer to the above description of the disclosure.

General user identification information of a link (or default user identification information of a link). In an embodiment, the identification information is used to send an SRB0 RRC message of the first node. The specific meaning of the identification information may refer to the above description of the disclosure. In an embodiment, after receiving the information, the third node will add the identification information to the data packet (such as the SRB0 RRC message) of the first node sent to the second node, or if the data packet received by the third node from the second node includes the identification information, the third node can learn that the data packet is the data packet (such as the SRB0 RRC message) of the first node, so the information (such as the SRB0 RRC message) included in the data packet is sent to the fourth node through a message belonging to the first node.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. The specific meaning of the identification information may refer to the above description of the disclosure. In an embodiment, after receiving the information, the third node will add the identification information to the data packet (such as the SRB0 RRC message) of the first node sent to the second node, or if the data packet received by the third node from the second node includes the identification information, the third node can learn that the data packet is the data packet (such as the SRB0 RRC message) of the first node, so the information (such as the SRB0 RRC message) included in the data packet is sent to the fourth node through a message belonging to the first node.

Information about a bearer or resource. The bearer or resource is used to transfer the data of the first node. In an embodiment, the bearer may be SRB0/1/2, a newly defined bearer, or an RLC bearer. In another embodiment, the resource may be a channel used to transfer the data of the first node, such as an RLC channel. In an embodiment, the information is related to a bearer or resource on an air interface link between the second node and the third node. In another embodiment, the information is related to a bearer or resource on a sidelink between the first node and the second node. In another embodiment, the information is not only related to the bearer or resource on the air interface link between the second node and the third node, but also related to the bearer or resource on the sidelink between the first node and the second node. For a bearer or resource, the information includes at least one of the following information:

Identification information of the bearer or resource. The information may be used to indicate a bearer used to transfer the data of the first node, such as SRB0, SRB1, SRB2, or a newly defined bearer, or used to indicate a channel used to transfer the data of the first node, such as an RLC channel, an air interface RLC channel, or a sidelink RLC channel, or used to indicate an RLC bearer, or an air interface RLC bearer, or a sidelink RLC bearer used to transfer the data of the first node.

QoS parameter information of the bearer or resource.

Indication information of a data type. The information indicates the type of data carried by the resource indicated by the "identification information of a bearer or resource", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Indication information of a default bearer (or default RLC bearer) or resource (such as default RLC channel). The information indicates that the bearer or resource identified by the "identification information of a bearer or resource" is a default bearer or resource, and the default bearer or resource is used to transfer the SRB0 message of the first node. In another embodiment, the "indication information of a default bearer (or default RLC bearer) or resource (such as default RLC channel)" may also be referred to as "indication information of a general bearer (or general RLC bearer) or resource (such as general RLC channel)."

Indication information for setting up a default bearer (or default RLC bearer) or resource (such as default RLC channel). In an embodiment, the default bearer or resource is used to transfer the SRB0 message of the first node, such as RRCSetupRequest, or RRCResumeRequest, or RRCResumeRequest1, or RRCReestablishmentRequest, or RRCSystemInfoRequest, or RRC-Setup, or RRCReject in TS38.331, or RRCConnectionSetupRequest, or RRCConnectionSetup, or RRCConnectionResumeRequest, or RRCConnectionReestablishmentRequest, or RRCConnectionReject in TS36.331. In an embodiment, the indication information may be explicit indication information. In another embodiment, the indication information may also be implicit indication information. If the fourth request message includes the "general user identification information of a link (or default user identification information of a link)" or the "general identification information of a remote user (or default identification information of a remote user, or general local identification information of a remote user, or default local identification information of a remote user, or general temporary identification information of a remote user, or default temporary identification information of a remote user)" or the "first temporary identification information", the third node sets up the default bearer (or default RLC bearer) or resource (or default RLC channel). After receiving the information, the third node will configure the default bearer or resource to transfer the data (such as SRB0 RRC message) of the first node. In another embodiment, the "default bearer (or default RLC bearer) or resource (such as default RLC channel)" may also be referred to as "general bearer (or general RLC bearer) or resource (such as general RLC channel)."

Indication information of a user to which the transferred data belongs. The information is used to indicate the user served by the relay terminal, the user transfers data with the base station through the relay terminal, the indication information may indicate one or more users, and the information may include identification information of the one or more users.

At step 1-1-2, the third node sends a fourth response message to the fourth node. The message is used to transfer configuration information generated by the third node. In an embodiment, the configuration information is used to configure an air interface link between the third node and the second node, and the air interface link is used to serve the data transfer of one or more or all first nodes (or serve the transfer of the SRB0 RRC message of one or more or all first nodes). For the air interface link serving one or more or all users, the message includes configuration information of the air interface link. In another embodiment, the configuration information is used to configure a sidelink between the first node and the second node. In another embodiment, the configuration information may be used to configure both the air interface link between the third node and the second node and the sidelink between the first node and the second node. The information includes at least one of the following information:
  Configuration information of an RLC (Radio Link Control) layer. In an embodiment, the configuration information of the RLC layer is about the configuration of a bearer or resource (the bearer or resource is used to serve the data of SRB and/or DRB) serving one or more first nodes.
  Configuration information of a logical channel. In an embodiment, the configuration information of the logical channel is about the configuration of a bearer or resource (the bearer or resource is used to serve the data of SRB and/or DRB) serving one or more first nodes.
  User identification information of a link. In an embodiment, the identification information identifies the first node on the link. The specific meaning of the identification information may refer to the above description of the disclosure. In addition, in an embodiment, the identification information may be received in step 1-1-1, then placed in a container and sent to the fourth node in step 1-1-2, and finally sent to the second node by the fourth node. In another embodiment, the identification information may be generated by the third node, and then sent to the second node by the fourth node.
  Identification information of a remote user. In an embodiment, the information identifies the first node. The specific meaning of the identification information may refer to the above description of the disclosure. In addition, in an embodiment, the identification information may be received in step 1-1-1, and then sent to the fourth node by putting the information in a container in step 1-1-2, and finally sent to the second node by the fourth node. In another embodiment, the identification information may be generated by the third node, and then sent by the fourth node to the second node.
  First default (or general or specific) configuration information. In an embodiment, the configuration information is about the configuration of a bearer or resource serving the SRB0 RRC (or SRB1 RRC) message of the first node. Further, the default configuration information is generated according to the "indication information for setting up a default bearer (or RLC bearer) or resource (such as RLC channel)" received in step 1-1-1. The configuration information includes at least one of the following information:
  Configuration information of a default RLC layer.
  Configuration information of a default logical channel.
  Configuration of an MAC layer.
  Configuration of a physical layer.
  General user identification information of a link (or default user identification information of a link). In an embodiment, the identification information is used to send an SRB0 RRC message of the first node. The specific meaning of the identification information may refer to the above description of the disclosure. In addition, in an embodiment, the identification information may be received in step 1-1-1, and then sent to the fourth node by putting the information in a container in step 1-1-2, and finally sent to the second node by the fourth node. In another embodiment, the identification information may be generated by the third node, and then sent by the fourth node to the second node.
  General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message of the first node. The specific meaning of the identification information may refer to the above description of the disclosure. In addition, in an embodiment, the identification information may be received in step 1-1-1, and then sent to the fourth node by putting the information in a container in step 1-1-2, and finally sent to the second node by the fourth node. In another embodiment, the identification information may be generated by the third node, and then sent by the fourth node to the second node.

If the above information included in the "fourth response message" is for an air interface link, the information may be included in a container for the air interface link, such as CellGroupConfig. If the above information included in the "fourth response message" is for a sidelink, the information may be included in a container for the sidelink, such as SL-PHY-MAC-RLC-Config.

At step 1-1-3, the fourth node sends a first configuration message to the second node. The message is used to configure the second node to transfer data of other users. In an embodiment, the first configuration message is sent by the fourth node to the second node through the third node. The configuration message includes at least one of the following information:
  Identification information of a user served by the second node. The information identifies a node that performs data transfer with the base station through the second node. For a user, the information includes at least one of the following information:
  User identification information of a link. In an embodiment, the identification information identifies the first node on the link.
  Identification information of a remote user. In an embodiment, the information identifies the first node.
  Configuration information of an air interface link. The air interface link is a link between the second node and the third node. For the air interface link serving one or more or all users (such as one or more or all first nodes), the information includes at least one of the following information:
  User identification information of a link. In an embodiment, the identification information identifies the first node on the link. The specific meaning of the identification information may refer to the above description of the disclosure.
  Identification information of a remote user (or referred to as local identification information of a remote user, or temporary identification information of a remote user). In an embodiment, the information identifies the first node. The specific meaning of the identification information may refer to the above description of the disclosure.

Configuration information of an RLC layer. In an embodiment, the configuration information of the RLC layer is about the configuration of a bearer or resource (the bearer or resource is used to serve the data of SRB and/or DRB) serving one or more first nodes.

Configuration information of a logical channel. In an embodiment, the configuration information of the logical channel is about the configuration of a bearer or resource (the bearer or resource is used to serve the data of SRB and/or DRB) serving one or more first nodes.

MAC layer configuration.

Physical layer configuration.

Configuration information of a sidelink. The sidelink is a link between the first node and the second node. For the sidelink serving one or more or all users (such as one or more or all first nodes), the information includes at least one of the following information:

User identification information of a link. In an embodiment, the identification information identifies the first node on the link. The specific meaning of the identification information may refer to the above description of the disclosure.

Identification information of a remote user (or referred to as local identification information of a remote user, or temporary identification information of a remote user). In an embodiment, the information identifies the first node. The specific meaning of the identification information may refer to the above description of the disclosure.

Configuration information of an RLC layer. In an embodiment, the configuration information of the RLC layer is for the configuration of a bearer or resource (the bearer or resource is used to serve the data of SRB and/or DRB) serving one or more first nodes.

Configuration information of a logical channel. In an embodiment, the configuration information of the logical channel is about the configuration of a bearer or resource (the bearer or resource is used to serve the data of SRB and/or DRB) serving one or more first nodes.

MAC layer configuration.

Physical layer configuration.

Second default (or general or specific) configuration information. In an embodiment, the configuration information is about the configuration of a bearer or resource serving the SRB0 RRC message (or SRB1 RRC message) of the first node. The configuration information includes at least one of the following information:

General user identification information of a link (or default user identification information of a link). In an embodiment, the identification information is used to send the SRB0 RRC message (or SRB1 RRC message) of the first node. The specific meaning of the identification information may refer to the above description of the disclosure.

General identification information of a remote user (or default identification information of a remote user, or general local identification information of a remote user, or default local identification information of a remote user, or general temporary identification information of a remote user, or default temporary identification information of a remote user). In an embodiment, the identification information is used to send the SRB0 RRC message (or SRB1 RRC message) of the first node. The specific meaning of the identification information may refer to the above description of the disclosure.

Default (general or specific) configuration information of an RLC layer. In an embodiment, the configuration information of the RLC layer is for the configuration of a bearer or resource serving the SRB0 RRC message (or SRB1 RRC message) of the first node, such as the configuration of the default bearer or resource described above.

Default (general or specific) configuration information of a logical channel. In an embodiment, the configuration information of the logical channel is for the configuration of a bearer or resource serving the SRB0 RRC message (or SRB1 RRC message) of the first node, such as the configuration of the default bearer or resource described above.

After the second node receives the configuration in the first configuration message, when the second node sends a data packet belonging to the first node to the third node/fourth node or the base station, the second node will send the data packet according to the resource configured in the "configuration information of an air interface link" (or "second default configuration information"), and further, the "user identification information of a link" (or "general user identification information of a link") or "identification information of a remote user" (or "general identification information of a remote user") may be added to the data packet; or when the third node/fourth node or the base station sends a data packet of the first node to the second node, the second node will receive the data packet according to the resource configured in the "configuration information of an air interface link" (or "second default configuration information"), and further, the first node to which the data packet belongs can be determined according to the "user identification information of a link" (or "general user identification information of a link") or "identification information of a remote user" (or "general identification information of a remote user") included in the data packet. In an embodiment, the data packet belonging to the first node that is sent or received by the second node may be a data packet including the SRB0 RRC message (or SRB1 RRC message), or may be other data packet.

After the third node receives the configuration in the fourth request message, when the third node sends a data packet belonging to the first node to the second node, the third node will send the data packet according to the resource configured in the fourth response message, and further, the "user identification information of a link" (or "general user identification information of a link") or "identification information of a remote user" (or "general identification information of a remote user") may be added to the data packet; or if the data packet received by the third node includes the "user identification information of a link" (or "general user identification information of a link") or "identification information of a remote user" (or "general identification information of a remote user"), the first node to which the data packet belongs can be determined. In an embodiment, the data packet belonging to the first node that is sent or received by the third node may be a data packet including the SRB0 RRC message (or SRB1 RRC message), or may be other data packet.

In the above process, the configuration information of the air interface link and/or the configuration information of the sidelink involved in steps 1-1-2 and 1-1-3 may be default configuration information or specific configuration information. In an embodiment, the configuration information of the air interface link is used to transfer the second request message and the second response message in the steps.

In addition, before step 1-1-1, optionally, the method may further include:

In a Step, the second node sends a first indication message to the fourth node. In an embodiment, the message may be sent by the second node to the fourth node through the third node. The message includes at least one of the following information:

Indication information of a relay terminal. The function of the information is to inform the fourth node that the second node is a relay terminal.

Indication information for allowing the function of the relay terminal. The function of the information is to inform the fourth node that the second node has facilitated the function of the relay terminal and can accept the access of a remote user (first node).

After receiving the first indication message, the fourth node will start steps 1-1-1/1-1-2/1-1-3 above to configure the resource required by the second node to serve the first node. Further, after step 1-1-0, the method may further include:

In a Step, the fourth node sends a second indication message to a core network node (such as AMF: Access and Mobility Management). The function of the indication is to inform the core network node of the information of the second node. The message includes at least one of the following information:

Indication information of a relay terminal. The function of the information is to inform the fourth node that the second node is a relay terminal.

Indication information for facilitating the function of the relay terminal. The function of the information is to inform the fourth node that the second node has facilitated the function of the relay terminal and can accept the access of a remote user (first node).

Identification information of one or more first nodes that access the relay terminal, such as 5G-S-TMSI (Temporary Mobile Subscriber Identity).

After the core network node receives the second instruction message, it will authenticate the second node. Only after the authentication succeeds, the second node can serve the first node. In order to provide the authentication result, the method may further include the following step:

In a Step, the core network node (such as AMF: Access and Mobility Management) sends a third indication message to the fourth node. The function of the indication is to inform the third node of information of the second node. The message includes at least one of the following information:

Authorized indication information. The information indicates that the core network node allows the second node to serve other terminals as a relay terminal.

Identification information of an allowed terminal(s). The information indicates identification information of one or more first nodes that are allowed to access the second node.

Information about the number of allowed terminals. The information indicates the number of first nodes that are allowed to access the second node.

After the fourth node receives the third indication message, it can start to configure the second node to serve the first node, such as steps 1-1-1 to 1-1-3 above.

The technical solution provided by the embodiment of the disclosure has at least the following beneficial effect:

The fourth node can configure air interface resources for transferring data of other users, so that data transfer of other users can be performed between the second node and the base station.

As an example, the aforementioned messages may be the following possible messages, but may also be other messages:

First request message, such as INITIAL UL RRC MESSAGE TRANSFER message and UL RRC MESSAGE TRANSFER message of an F1 interface;

First response message, such as DL RRC MESSAGE TRANSFER message of the F1 interface, and UE CONTEXT SETUP/MODIFICATION RESPONSE message;

Second request message, such as an existing RRC message (ULInformationTransfer), or a newly defined RRC message, such as an ULSidelinkRelayMessage, or a data packet including an adaptation layer header;

Second response message, such as an existing RRC message (DLInformationTransfer), or a newly defined RRC message, such as a DLSidelinkRelayMessage, or a data packet including an adaptation layer header;

Third request message, which may be an RRC message on a sidelink, or an existing RRC message, such as RRCSetupRequest, or RRCResumeRequest, or RRCReestablishmentRequest in TS38.331, or RRCConnectionSetupRequest, or RRCConnectionResumeRequest, or RRCConnectionReestablishmentRequest in TS36.331;

Third response message, which may be an RRC message on a sidelink, or an existing RRC message, such as RRCSetup, or RRCResume, or RRCReestablishment in TS38.331, or RRCConnectionSetup, or RRCConnectionResume, or RRCConnectionReestablishment in TS36.331;

Fourth request message, such as UE CONTEXT SETUP/MODIFICATION REQUEST message of the F1 interface;

Fourth response message, such as UE CONTEXT SETUP/MODIFICATION RESPONSE message of the F1 interface;

First configuration message, such as RRCReconfiguration message, and RRCConnectionReconfiguration message;

First indication message, such as SidelinkUEInformationNR message;

Second indication message, such as INITIAL UE Message of the AMF and gNB interface; and Third indication message, such as INITIAL UE CONTEXT SETUP REQUEST message of the AMF and gNB interface.

In addition, the above steps can be combined with each other. In an example, the following process may include that the fourth node configures the second node with a resource for transferring the SRB0 RRC message (or SRB1 RRC message) of the first node, and the first node accesses the network through the second node by using the configured resource.

In a Step, the second node sends a first indication message to the fourth node. See step above. Optionally, the interaction between the fourth node and the core network node may be included after this step. See steps above.

In a Step, the fourth node sends a fourth request message to the third node. See step 1-1-1 above.

In a Step, the third node sends a fourth response message to the fourth node. See step 1-1-2 above.

In a Step, the fourth node sends a first configuration message to the second node. See step 1-1-3 above.

In a Step, the first node sends a third request message to the second node. See step 1-a1 or 1-b1 above.

In a Step, the second node sends a second request message to the third node. See step 1-a2 or 1-b2 above.

In a Step, the third node sends a first request message to the fourth node. See steps above. Optionally, the method may further include the step of configuring the second node by the fourth node. One of the functions of this step is to configure the identification information of the first node to the second node, such as the aforementioned "user identification information of a link" or "identification information of a remote user."

In a Step, the fourth node sends a first response message to the third node. See steps above.

In a Step, the third node sends a second response message to the second node. See steps above.

In a Step, the second node sends a third response message to the first node. See steps above.

Second aspect of the disclosure: method of data mapping configuration.

In order to realize sidelink relay, the user needs to transfer data with the base station through a relay terminal (relay UE), that is, user data is sent to the base station through the relay terminal, or the base station sends data to the base station through the relay terminal. In this process, the base station needs to send data of different users to the relay terminal, and the relay terminal needs to be able to identify the data of different users and send the data to different users; similarly, after the base station receives data from the relay terminal, the base station needs to distinguish the data of different users. Therefore, the sidelink relay brings a technical problem: how the base station and the relay terminal identify the data of different users. In order to solve the technical problem, the second aspect proposes an interaction process between the central unit of the base station (or the control plane of the central unit) and the distributed unit of the base station, and an interaction process between the central unit of the base station and the relay terminal. These processes can complete the configuration of user data transfer, so as to help the base station or the distributed unit of the base station, or the relay terminal to identify the data of different users.

Figure 9:
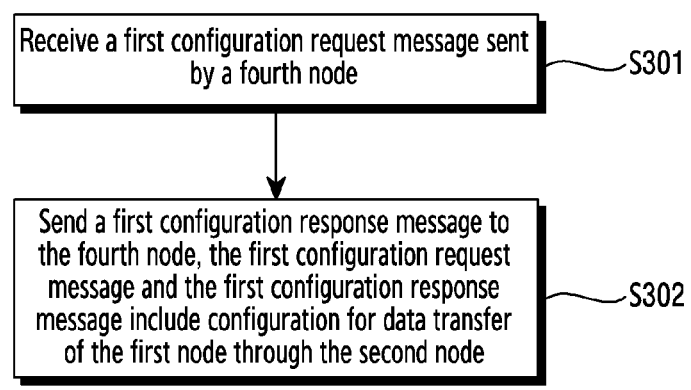
FIG. 9 is a schematic flowchart of data transfer according to an embodiment of the disclosure.

FIG. 9 is a schematic flowchart of data transfer according to an embodiment of the disclosure.

Referring to FIG. 9, an embodiment of the disclosure provides a method executed by a third node. The method includes:

At step S301, a first configuration request message sent by a fourth node is received.

In an embodiment, the first configuration request message includes at least one of the following:
- user identification information of the F1 interface, the user identification information of the F1 interface being used to identify at least one of a first node and a second node;
- first configuration information, the first configuration information being about a configuration performed when the first node is configured;
- second configuration information, the second configuration information being about a configuration used when the second node is configured; and
- third configuration information, the third configuration information being used to notify the configuration information required for the generation of configuration of the second node.

In an embodiment, the first configuration information includes at least one of the following:
- identification information of a radio bearer;
- information about the quality of service (QoS) of the radio bearer;
- a fourth container, the fourth container including a control signaling message or a packet data convergence protocol service data unit (PDCP PDU), and the PDCP PDU including the control signaling message;
- first mapping information; and
- information about a first tunnel, the information about the first tunnel being indicative of information about the fourth node.

In an embodiment, the first mapping information includes at least one of the following:
- first identification information of user data;
- first adaptation layer information; and
- first indication information, the first indication information being indicative of a resource used to transfer data.

In an embodiment, the information about the first tunnel includes at least one of the following:
- identification information of the first tunnel;
- address information of the first tunnel;
- endpoint identification information of the first tunnel;
- header information for a data packet;
- indication information of a data transfer direction; and
- first tunnel mapping information.

In an embodiment, the first tunnel mapping information includes at least one of the following:
- first information of a data tunnel;
- second adaptation layer information; and
- second indication information, the second indication information being indicative of a resource used to transfer data.

In an embodiment, the second configuration information includes at least one of the following:
- third indication information, the third indication information being indicative of a resource used to transfer data;
- QoS information of user data;
- a fifth container, the fifth container including a control signaling message or a PDCP PDU, and the PDCP PDU including the control signaling message;
- second mapping information; and
- second tunnel mapping information, the second tunnel mapping information being indicative of data carried by the resource indicated by the third indication information.

In an embodiment, the second mapping information includes at least one of the following:
- second identification information of user data; and
- third adaptation layer information.

In an embodiment, the second tunnel mapping information includes at least one of the following:
- fourth adaptation layer information; and
- information about the first tunnel.

In an embodiment, the information about the first tunnel includes at least one of the following:
- identification information of the first tunnel;
- address information of the first tunnel;
- endpoint identification information of the first tunnel;
- header information for a data packet; and
- indication information of a data transfer direction.

In an embodiment, the third configuration information includes at least one of the following:
- fourth indication information, the fourth indication information being indicative of a resource used to transfer data;
- first data packet information; and
- seventh indication information of a resource bearing user data.

In an embodiment, the first data packet information includes at least one of the following:

user identification information of the F1 interface, the user identification information of the F1 interface being used to identify at least one of a first node and a second node;

first identification information of the first node, the first identification information being used to identify the first node on the link;

second identification information of the first node, the second identification information being used to identify the first node;

identification information of a radio bearer;

fifth data identification information;

identification information of a logical channel of a sidelink; and identification information of a logical channel of an air interface link.

At step S302, a first configuration response message is sent to the fourth node, the first configuration request message and the first configuration response message including configuration for data transfer of the first node through the second node.

In an embodiment, the first configuration response message includes at least one of the following:

user identification information of the F1 interface, the user identification information of the F1 interface being used to identify at least one of a first node and a second node;

fourth configuration information, the fourth configuration information being indicative of configuration information of data for the first node;

first resource configuration information for the first node;

second resource configuration information for the second node; and third resource configuration information.

In an embodiment, the fourth configuration information includes at least one of the following:

identification information of a radio bearer; and information of a second tunnel.

In an embodiment, the information of the second tunnel includes at least one of the following:

identification information of the second tunnel;

address information of the second tunnel; and endpoint identification information of the second tunnel.

In an embodiment, the second resource configuration information includes at least one of the following:

fifth indication information, the fifth indication information being indicative of a resource used to transfer data;

second data packet information; and eighth indication information of a resource bearing user data.

In an embodiment, the second data packet information includes at least one of the following:

user identification information of the F1 interface, the user identification information of the F1 interface being used to identify at least one of a first node and a second node;

first identification information of the first node, the first identification information being used to identify the first node on the link;

second identification information of the first node, the second identification information being used to identify the first node;

identification information of a radio bearer;

sixth data identification information;

identification information of a logical channel of a sidelink; and identification information of a logical channel of an air interface link.

The technical solution provided by the embodiment of the disclosure has at least the following beneficial effect:

The configuration of data transfer of the first node is realized.

Figure 10:
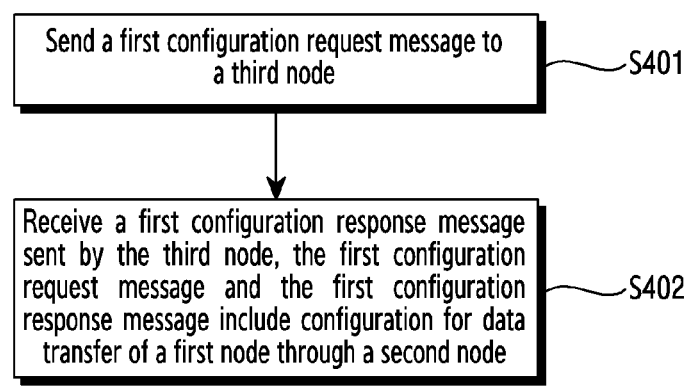
FIG. 10 is a schematic flowchart of data transfer according to an embodiment of the disclosure.

FIG. 10 is a schematic flowchart of data transfer according to an embodiment of the disclosure.

Referring to FIG. 10, an embodiment of the disclosure provides a method executed by a fourth node. The method includes:

At step S401, a first configuration request message is sent to a third node.

At step S402, a first configuration response message sent by the third node is received, the first configuration request message and the first configuration response message include configuration for data transfer of a first node through a second node.

In an embodiment, a second configuration request message is sent to the first node or the second node, the second configuration request message being used to configure data transfer of the first node or the second node.

In an embodiment, the fourth node includes a fifth node and a sixth node, which is characterized by further including:

the fifth node transferring a third configuration request message to the sixth node, the third configuration request message being used to configure data transfer of the sixth node.

The technical solution provided by the embodiment of the disclosure has at least the following beneficial effect:

The configuration of data transfer of the first node is realized.

The second aspect proposes an interaction process between the central unit of the base station (or the control plane of the central unit) and the distributed unit of the base station, and an interaction process between the central unit of the base station and the relay terminal. These processes can complete the configuration of user data transfer, so as to help the base station or the distributed unit of the base station, or the relay terminal to identify the data of different users.

Figure 11:
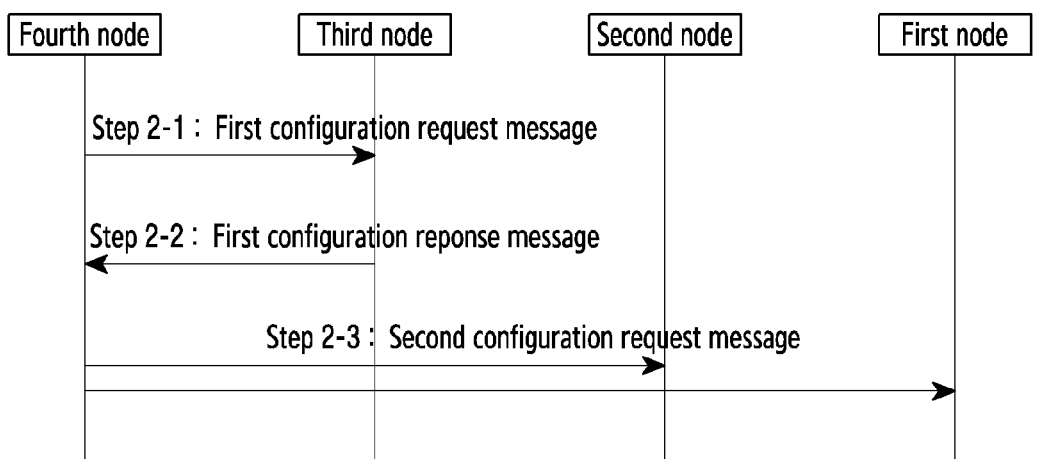
FIG. 11 is a schematic flowchart of data mapping configuration according to an embodiment of the disclosure.

FIG. 11 is a schematic flowchart of data mapping configuration according to an embodiment of the disclosure.

Referring to FIG. 11, in an embodiment, the interaction process is shown including the following:

At step 2-1, the fourth node sends a first configuration request message to the third node. The message is used to configure the transfer of user data. The message includes at least one of the following information:

User identification information of an F1 interface, such as user F1 application protocol layer identification information gNB-CU UE F1AP ID on the central unit side of the base station, and/or user F1 application protocol layer identification information gNB-DU UE F1AP ID on the distributed unit side of the base station. In an embodiment, the identification information is used to identify the first node, and further, the first configuration request message is a message for the first node. In another embodiment, the identification information is used to identify the second node, and further, the first configuration request message is a message for the second node.

First data configuration information. The first data configuration information is about a configuration used when the first node is configured. The information indicates configuration information related to the data of the first node. In an embodiment, when the "first configuration request message" is for the first node (such as an F1AP message related to the first node on the F1 interface), the "first configuration request message" may include the "first data configuration information". The information includes at least one of the following information:

Identification information of a radio bearer, such as SRB ID, DRB ID, sidelink SRB ID, or sidelink DRB ID.

Identification information of user data. The information is used to indicate the user data corresponding to the "identification information of a radio bearer". The information is different from the identifier of the radio bearer. In an embodiment, the information may be identification information obtained by uniformly numbering SRB and DRB. According to the identification information, the receiver can learn the type of data (SRB or DRB), and can also learn the identifier of the bearer corresponding to the data (such as SRB ID, DRB ID). Further, the identification information may be added to a data packet header for transfer (for example, sent from the third node to the second node, from the second node to the first node, from the first node to the second node, from the second node to the third node). As an example, the identification information may be named adaptation layer bearer ID or bearer Index, or may have other names.

Information about the Quality of Service (QoS) of the radio bearer. See DRB QoS information in TS38.473.

Fourth container. The container contains a control signaling message (such as RRC message), or a Packet Data Convergence Protocol (PDCP) service Data unit (PDU) including a control signaling message. In an embodiment, the control signaling message may be an RRC message. In another embodiment, the control signaling message may be an RRC message sent to the first node.

First mapping information. In an embodiment, the first mapping information is about mapping configured for control plane data (such as the signaling radio bearer indicated by the "identification information of a radio bearer", or the data included in the fourth container). In another embodiment, the first mapping information may also be user plane data (such as the data radio bearer indicated by the "identification information of a radio bearer"). Further, the information may be used to indicate mapping of data (such as uplink data, or downlink data, or uplink and downlink data). Specifically, the first mapping information may be, respectively, given for uplink data and downlink data, then the uplink and downlink data may use different mappings, or the first mapping information may be given for both uplink and downlink data, then the uplink and downlink data use the same mapping, or the first mapping information may be given for uplink or downlink data only, then the transferred data is uplink or downlink. In another embodiment, the information is used to configure a data packet of a control plane. The information includes at least one of the following information:

First identification information of user data. The information is used to indicate the user data specified by the "first mapping information". In an embodiment, the information may be identification information of a radio bearer, such as SRB ID or DRB ID, and further, the "first identification information of user data" may be the "identification information of a radio bearer" included in the "first data configuration information". In another embodiment, the information may be newly defined identification information that can distinguish different types of data (such as data belonging to different bearers, and data belonging to different tunnels). The information is different from the identification information of a bearer, such as adaptation layer bearer ID or bearer Index, or may also have other names.

Indication information of a transfer direction, such as an indication of uplink data, an indication of downlink data, and an indication of uplink and downlink data.

First indication information of a resource bearing user data. The information indicates a resource used to transfer data (such as data of the first node, or a signaling radio bearer or data radio bearer indicated by the "first identification information of user data", or data included in the fourth container). The resource is a resource on the air interface link between the third node and the second node. The transferred data may be data sent by the third node to the second node, or data sent by the second node to the third node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer on an air interface link, and the indication information is identification information of the RLC bearer (such as RLC bearer ID, ingress RLC bearer ID, or egress RLC bearer ID).

Indication information of a data type. The information indicates the type of data carried by the resource indicated by the "first indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

First adaptation layer information. The information indicates information in a data packet. In an embodiment, the information is information that needs to be added when the third node sends the data packet. In another embodiment, the information is information included in the data packet received by the third node. The information includes at least one of the following information:

User identification information of a link. In an embodiment, the identification information identifies the first node on the link.

Identification information of a remote user. In an embodiment, the information identifies the first node.

Identification information of a radio bearer, such as signaling radio bearer SRB ID, or data radio bearer DRB ID.

Indication information of a data type, indicating a type of data, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

First data identification information. The information indicates different types of data transferred by the third node (such as data sent by the third node to the second node, or data sent by the second node to the third node), such as data belonging to different bearers, and data belonging to different tunnels. The identification information is allocated by the fourth node or the third node. In an embodiment, the "first data identification information" may be different from the "first identification information of user data", or may be different from the "identification information of a radio bearer", such as adaptation layer bearer ID or bearer Index, or may have other names.

User identification information of an F1 interface, such as gNB-CU UE F1AP ID, and/or gNB-DU UE F1AP ID. In an embodiment, the information identifies the first node. In another embodiment, the identification information is used to identify the second node.

In an embodiment, one or more of the "first mapping information" may be information included in a data packet received by the third node (such as a data packet received from the second node, or a data packet received from the fourth node), or in a data packet that the third node needs to send. After the third node receives the "first mapping information", the third node will map the received data. For example, after the third node receives a data packet from the fourth node (the data packet may be a data packet including control signaling, or the data packet is a data packet indicated by the "first identification information of user data"), the third node will add the one or more information in the "first mapping information" (such as one or more of the "first adaptation layer information") to the data packet, and then send the same through the resource indicated by the "first indication information of a resource bearing user data"; after the third node receives a data packet from the second node (the data packet may be a data packet including control signaling, or the data packet is a data packet indicated by the "first identification information of user data"), if the data packet includes the information included in the "first mapping information" (such as one or more of the "first adaptation layer information"), the third node deletes the information included, and then determines the sending to the fourth node according to the "first mapping information."

Information about a first tunnel. The information about the first tunnel is for user plane data, and the information indicates information on the fourth node side (such as the central unit of the base station, or the user plane of the central unit of the base station). The information includes at least one of the following information:

Tunnel identification information, such as tunnel ID.

Address information, such as IP address information.

Tunnel endpoint identification information, such as tunnel endpoint ID.

Header information, such as Differentiated Services Code Point (DSCP), or a set value of flow label. In an embodiment, the information is for a downlink data packet.

Indication information of a data transfer direction, such as uplink, downlink, uplink and downlink. If it is downlink, the data is downlink data corresponding to the tunnel.

First tunnel mapping information. The first tunnel mapping information is about mapping configured for user plane data, and the information is used to indicate the mapping of data (such as uplink data, or downlink data, or uplink and downlink data) carried on the tunnel. The tunnel specified by the information may be an uplink tunnel, a downlink tunnel, or both an uplink tunnel and a downlink tunnel. The specified uplink tunnel may be a tunnel indicated by the information included in the "information about a first tunnel" (such as at least one of tunnel identification information, address information, and tunnel endpoint identification information, and the information is information on the fourth node side); the specified downlink tunnel may be a downlink tunnel corresponding to the tunnel indicated by the "information about a first tunnel" (the address information included in the downlink tunnel is information on the third node side. In an embodiment, the information is known in advance by the fourth node. In another embodiment, the information will be provided by the third node in step 2-2 below); further, the information may also be used to indicate information in a data packet (such as information that needs to be added when the data packet is sent, or information included in the received data packet). For a bearer, the mapping used by the uplink tunnel and the downlink tunnel may be different (this information may include mapping information of data of the uplink tunnel and/or mapping information of data of the downlink tunnel), or may be the same (this information may include mapping information of data of the uplink and downlink tunnels). Therefore, the information may include mapping information for one or more tunnels. For a tunnel (an uplink tunnel, or a downlink tunnel, or uplink and downlink tunnels), the information includes at least one of the following information:

First information of a data tunnel. The information indicates a tunnel used when the data specified by the "first tunnel mapping information" is transferred. The information includes at least one of the following information:

Information of an uplink tunnel. The information indicates information on the fourth node side, such as tunnel identifier, address information (such as IP address), or tunnel endpoint identification information (such as tunnel endpoint ID). In an embodiment, the tunnel indicated by the information is the same as the tunnel indicated by the information included in the "information about a first tunnel" (such as at least one of tunnel identification information, address information, and tunnel endpoint identification information).

Information of a downlink tunnel. The information indicates information on the third node side, such as tunnel identifier, address information (such as IP address), or tunnel endpoint identification information (such as tunnel endpoint ID). In an embodiment, the tunnel indicated by the information may correspond to the tunnel indicated by the "information of an uplink tunnel."

Indication information of an uplink tunnel. The information is used to indicate that the other information included in the "first tunnel mapping information" is for the mapping of data on an uplink tunnel. The indication information may be an explicit indication or an implicit indication. It should be noted that the indication information does not include information related to the uplink tunnel (such as address information, and tunnel endpoint identification information).

Indication information of a downlink tunnel. The information is used to indicate that the other information included in the "first tunnel mapping information" is for the mapping of data on a downlink tunnel. The indication information may be an explicit indication or an implicit indication. It should be noted that the indication information does not include information related to the downlink tunnel (such as address information, and tunnel endpoint identification information). In an embodiment, the tunnel indicated by the indication information may be a downlink tunnel corresponding to the tunnel indicated by the "information of an uplink tunnel."

Second indication information of a resource bearing user data. The information indicates a resource used to transfer data (such as data of the first node, or user plane data of the first node, or data carried by the tunnel indicated by the "first information of a data tunnel"), and the resource is a resource on the air interface link between the third node and the second node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer on an air interface link, and the indication information is identification information of the RLC bearer (such as RLC bearer ID, ingress RLC bearer ID, or egress RLC bearer ID).

Indication information of a data type. The information indicates the type of data carried by the resource indicated by the "second indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Second adaptation layer information. The information indicates information in a data packet. In an embodiment, the information is information that needs to be added when the third node sends the data packet. In another embodiment, the information is information included in the data packet received by the third node. The information includes at least one of the following information:

User identification information of a link. In an embodiment, the identification information identifies the first node on the link.

Identification information of a remote user. In an embodiment, the information identifies the first node.

Identification information of a radio bearer, such as SRB ID, or DRB ID.

Indication information of a data type, indicating a type of data, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Second data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a radio bearer", such as adaptation layer bearer ID or bearer Index, or may have other names.

User identification information of an F1 interface, such as gNB-CU UE F1AP ID, and/or gNB-DU UE F1AP ID. In an embodiment, the information identifies the first node.

In an embodiment, one or more of the "first tunnel mapping information" may be information included in a data packet received by the third node, or in a data packet that the third node needs to send. After the third node receives the "first tunnel mapping information", the third node will map the received data. In an embodiment, after the third node receives a data packet from the fourth node (the data packet may be user plane data, or data from the tunnel indicated by the "first information of a data tunnel"), the third node will add the one or more information in the "first tunnel mapping information" (such as one or more of the "second adaptation layer information") to the data packet, and then sends the same through the resource indicated by the "second indication information of a resource bearing user data". In another embodiment, after the third node receives a data packet from the fourth node (the data packet may be user plane data, or data from the tunnel indicated by the "first information of a data tunnel"), if the data packet includes the one or more information in the "first tunnel mapping information" (such as one or more of the "second adaptation layer information"), the third node sends the data packet through the resource indicated by the "second indication information of a resource bearing user data". In another embodiment, after the third node receives a data packet from the second node (the data packet may be user plane data), if the data packet includes the one or more information in the "first tunnel mapping information" (such as one or more of the "second adaptation layer information"), the third node will delete the information included, and then determine a tunnel used when sending a data packet to the fourth node (a tunnel indicated by the "first information of a data tunnel") according to the "first tunnel mapping information."

Second data configuration information. The second data configuration information is about a configuration used when the second node is configured. The information indicates configuration information related to the data of the second node. In an embodiment, the configuration information is used to configure an air interface link between the second node and the third node. In an embodiment, when the "first configuration request message" is for the second node, the "first configuration request message" may include the "second data configuration information". The information includes at least one of the following information:

Third indication information of a resource bearing user data. The information indicates a resource used to transfer data (such as data of the first node). The transferred data may be data sent by the third node to the second node, or data sent by the second node to the third node. The resource is a resource on an air interface link between the third node and the second node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer on an air interface link, and the indication information is identification information of the RLC bearer (such as RLC bearer ID, ingress RLC bearer ID, or egress RLC bearer ID).

QoS information of user data. See DRB QoS information in TS38.473.

Indication information of a data type. The information indicates the type of data carried by the resource indicated by the "third indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Fifth container. The container contains a control signaling message (such as RRC message), or a PDCP PDU including a control signaling message. In an embodiment, the control signaling message may be an RRC message. In another embodiment, the control signaling message may be an RRC message sent to the first node.

Second mapping information. The information is used to indicate mapping of data (such as uplink data, or downlink data, or uplink and downlink data). In an embodiment, the information is used to configure a data packet of a control plane. In another embodiment, the information is used to configure the data packet of the user plane. Further, the information indicates the configuration of a data packet transferred through the resource indicated by the "third indication information of a resource bearing user data", and the data packet may belong to the same first node or different first nodes. The mapping information may give different mappings for different data types. For a data type, the information includes at least one of the following information:

Second identification information of user data. The information is used to indicate the user data specified by the "second mapping information". In an embodiment, the information may be identification information of a radio bearer, such as SRB ID or DRB ID, and further, the "first identification information of user data" may be the "identification information of a radio bearer" included in the "first data configuration information". In another embodiment, the information may be newly defined identification information that can distinguish different types of data (such as data belonging to different bearers, and data belonging to different tunnels). The information is different from the identification information of a bearer, such as adaptation layer bearer ID or bearer Index, or may also have other names.

Third adaptation layer information. The information indicates information in a data packet. In an embodiment, the information is information that needs to be added when the third node sends the data packet. In another embodiment, the information is information included in the data packet received by the third node. The information includes at least one of the following information:

User identification information of a link. In an embodiment, the identification information identifies the first node on the link.

Identification information of a remote user. In an embodiment, the information identifies the first node.

Identification information of a radio bearer, such as SRB ID, or DRB ID.

Indication information of a data type, indicating a type of data, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Third data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a radio bearer", such as adaptation layer bearer ID or bearer Index, or may have other names.

User identification information of an F1 interface, such as gNB-CU UE F1AP ID, and/or gNB-DU UE F1AP ID. In an embodiment, the information identifies the first node.

In an embodiment, one or more of the "second tunnel mapping information" may be information included in a data packet received by the third node, or in a data packet that the third node needs to send. After the third node receives the "second mapping information", the third node will map the received data. For example, after the third node receives a data packet from the fourth node (the data packet may be a data packet including control signaling, or the data packet is a data packet indicated by the "second identification information of user data"), the third node will add the one or more information in the "second mapping information" (such as one or more of the "third adaptation layer information") to the data packet, and then send the same through the resource indicated by the "third indication information of a resource bearing user data"; after the third node receives a data packet from the second node (the data packet may be a data packet including control signaling, or the data packet is a data packet indicated by the "second identification information of user data"), if the data packet includes the information included in the "second mapping information" (such as one or more of the "third adaptation layer information"), the third node deletes the information included, and then determines the sending to the fourth node according to the "second mapping information."

Second tunnel mapping information. The second tunnel mapping information is for user plane data. The information is used to indicate data carried by the resource indicated by the "third indication information of a resource bearing user data" (such as uplink data, or downlink data, or uplink and downlink data). Further, the information indicates the configuration of a data packet belonging to one or more tunnels that is transferred through the resource indicated by the "third indication information of a resource bearing user data", and the data packet may belong to the same first node, or may also belong to different first nodes. For a type of data (such as data in a tunnel), the information includes at least one of the following information:

Information of a first tunnel. The tunnel is a tunnel for bearing data. In an embodiment, the tunnel is a tunnel for bearing uplink data (such as an egress tunnel). In another embodiment, the tunnel is a tunnel for bearing downlink data (such as an ingress tunnel). In another embodiment, the information is used to indicate uplink and downlink data. The information includes at least one of the following information:

Identification information of a tunnel. The information identifies a tunnel for bearing data. In an embodiment, the information may be included in a data packet.

Address information, such as IP address information.

Header information, such as DSCP, or a set value of flow label. In an embodiment, the information is for a downlink data packet.

Tunnel endpoint identification information, such as tunnel endpoint ID.

Transfer direction information of data carried by the tunnel, such as uplink, downlink, uplink and downlink.

Fourth adaptation layer information. The information indicates information in a data packet. In an embodiment, the information is information that needs to be added when the third node sends the data packet. In another embodiment, the information is information included in the data packet received by the third node. The information includes at least one of the following information:

User identification information of a link. In an embodiment, the identification information identifies the first node on the link, and the information may be included in a data packet.

Identification information of a remote user. In an embodiment, the information identifies the first node, and the information may be included in a data packet.

User identification information of an F1 interface, such as gNB-CU UE F1AP ID, and/or gNB-DU UE F1AP ID. In an embodiment, the information identifies the first node, and the information may be included in a data packet.

Identification information of a bearer, such as DRB ID or SRB ID. The information may be included in a data packet.

Indication information of a data type, indicating a type of data, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Fourth data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID.

It should be noted that if it is for an uplink tunnel, the "address information" and/or "tunnel endpoint identification information" are information on the fourth node side, and if it is for a downlink tunnel, the "address information" and/or "tunnel endpoint identification information" is information on the third node side. In an embodiment, one or more of the "second tunnel mapping information" may be information included in a data packet received by the third node, or in a data packet that the third node needs to send. After the third node receives the "second tunnel mapping information", the third node will map the received data. In an embodiment, after the third node receives a data packet from the fourth node (the data packet may be user plane data, or data from the tunnel indicated by the "information of a first tunnel"), the third node will add the one or more information in the "second tunnel mapping information" (such as one or more of the "fourth adaptation layer information") to the data packet, and then sends the same through the resource indicated by the "third indication information of a resource bearing user data". In another embodiment, after the third node receives a data packet from the fourth node (the data packet may be user plane data, or data from the tunnel indicated by the "information of a first tunnel"), if the data packet includes the one or more information in the "second tunnel mapping information" (such as one or more of the "fourth adaptation layer information"), the third node sends the data packet through the resource indicated by the "third indication information of a resource bearing user data". In another embodiment, after the third node receives a data packet from the second node (the data packet may be user plane data), if the data packet includes the one or more information in the "second tunnel mapping information" (such as one or more of the "fourth adaptation layer information"), the third node will delete the information included, and then determine a tunnel used when sending a data packet to the fourth node according to the "second tunnel mapping information."

Third data configuration information. The third data configuration information is used to inform configuration information required when the configuration of the second node is generated. The information indicates the configuration of the second node. Further, the information may also help the third node to generate the configuration of the second node. The information includes at least one of the following information:

Fourth indication information of a resource bearing user data. The information indicates a resource used to transfer data (such as data of the first node), and the resource is a resource on the air interface link between the third node and the second node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer, and the indication information is identification information of the RLC bearer (such as RLC bearer ID, ingress RLC bearer ID, or egress RLC bearer ID).

Indication information of a data type. The information indicates the type of data carried by the resource indicated by the "fourth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

First data packet information. The information indicates information included in a data packet. In an embodiment, the information indicates information that needs to be included in a data packet when the second node sends data. In another embodiment, the information indicates information included in a data packet received by the second node. In addition, the information further includes information used when the second node receives and sends the data packet. The information includes at least one of the following information:

User identification information of a link. In an embodiment, the identification information identifies the first node on the link, and the information may be included in a data packet.

Identification information of a remote user. In an embodiment, the information identifies the first node, and the information may be included in a data packet.

User identification information of an F1 interface, such as gNB-CU UE F1AP ID, and/or gNB-DU UE F1AP ID. In an embodiment, the information identifies the first node, and the information may be included in a data packet.

Identification information of a bearer, such as DRB ID or SRB ID. The information may be included in a data packet.

Indication information of a data type, indicating a type of data, such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Fifth data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID.

Identification information of a logical channel of a sidelink. The information indicates a logical channel used to transfer data on a sidelink (such as a link between the first node and the second node), such as sidelink logical channel identification (LCID), ingress sidelink LCID, or egress sidelink LCID.

Identification information of a logical channel of an air interface link. The information indicates a logical channel used to transfer data on an air interface link (such as a link between the second node and the third node), such as air interface Uu LCID, ingress Uu LCID, or egress Uu LCID.

Seventh indication information of a resource bearing user data. The information indicates a resource used to transfer data (such as data of the first node), and the resource is a resource on a sidelink between the second node and the first node. In an embodiment, the resource may be a channel on a sidelink (such as a Sidelink RLC channel), and the indication information is identification information of the sidelink RLC channel (such as Sidelink RLC CH ID, ingress Sidelink RLC CH ID, or egress Sidelink RLC CH ID). In another embodiment, the resource may be a bearer on a sidelink (such as Sidelink DRB, or Sidelink SRB), and the indication information is identification information of the sidelink bearer (such as sidelink RB ID, ingress sidelink RB ID, or egress sidelink RB ID). In another embodiment, the resource may be a logical channel on a sidelink, and the indication information is identification information of the sidelink logical channel (such as sidelink LCID, ingress sidelink LCID, or egress sidelink LCID). In another embodiment, the resource may be an RLC bearer on a sidelink, and the indication information is identification information of the RLC bearer on the sidelink (such as sidelink RLC bearer ID, egress sidelink RLC bearer ID, or ingress sidelink RLC bearer ID).

Indication information of a data type. The information indicates the type of data carried by the resource indicated by the "seventh indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

The aforementioned "third data configuration information" is configured to the second node to perform data mapping between a sidelink and an air interface link. Specifically, in an embodiment, after the second node receives the "third data configuration information", if the second node receives a data packet through the resource on the air interface link indicated by the "fourth indication information of a resource bearing user data", optionally, the data packet includes one or more information indicated by the "first data packet information", then the second node will send the data packet through the resource on the sidelink indicated by the "seventh indication information of a resource bearing user data". In another embodiment, after the second node receives the "third data configuration information", if the second node receives a data packet through the resource on the sidelink indicated by the "seventh indication information of a resource bearing user data", optionally, the data packet includes one or more information indicated by the "first data packet information", then the second node will send the data packet through the resource on the air interface link indicated by the "fourth indication information of a resource bearing user data."

Fifth data configuration information. The information is about a configuration used when the second node is configured. The information indicates configuration information related to the data of the second node. In an embodiment, the configuration information is used to configure a sidelink between the second node and the first node. In an embodiment, when the "first configuration request message" is for the second node, the "first configuration request message" may include the "fifth data configuration information". The information includes at least one of the following information:

Tenth indication information of a resource bearing user data. The information indicates a resource used to transfer data (such as data of the first node). The transferred data may be data sent by the first node to the second node, or data sent by the second node to the first node. The resource is a resource on a sidelink between the third node and the second node. In an embodiment, the resource may be a channel (such as an RLC channel) on a sidelink, and the indication information is identification information of the RLC channel (such as RLC CH ID, ingress RLC CH ID, or egress RLC CH ID). In another embodiment, the resource may be a bearer (such as DRB, or SRB) on a sidelink, and the indication information is identification information of the bearer (such as RB ID, ingress RB ID, or egress RB ID). In another embodiment, the resource may be a logical channel on a sidelink, and the indication information is identification information of the logical channel (such as LCID, ingress LCID, or egress LCID). In another embodiment, the resource may be an RLC bearer on a sidelink, and the indication information is identification information of the RLC bearer (such as RLC bearer ID, ingress RLC bearer ID, or egress RLC bearer ID).

Indication information of a data type. The information indicates the type of data carried by the resource indicated by the "tenth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Fourth data packet information. The information indicates information included in a data packet. In an embodiment, the information indicates information that needs to be included in a data packet when the second node sends data. In another embodiment, the information indicates information included in a data packet received by the second node. In addition, the information further includes information used when the second node receives and sends the data packet. The information includes at least one of the following information:

User identification information of a link. In an embodiment, the identification information identifies the first node on the link, and the information may be included in a data packet.

Identification information of a remote user. In an embodiment, the information identifies the first node, and the information may be included in a data packet.

User identification information of an F1 interface, such as gNB-CU UE F1AP ID, and/or gNB-DU UE F1AP ID. In an embodiment, the information identifies the first node, and the information may be included in a data packet.

Identification information of a bearer, such as DRB ID or SRB ID. The information may be included in a data packet.

Indication information of a data type, indicating a type of data, such as control plane data, user plane data, a signaling radio bearer, a data radio bearer, or a Signaling Radio Bearer 1 (SRB1), a Signaling Radio Bearer 2 (SRB2), or a Signaling Radio Bearer 0 (SRB0).

Fifth data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID.

Identification information of a logical channel of a sidelink. The information indicates a logical channel used to transfer data on a sidelink (such as a link between the first node and the second node), such as sidelink logical channel identification (LCID), ingress sidelink LCID, or egress sidelink LCID.

Identification information of a logical channel of an air interface link. The information indicates a logical channel used to transfer data on an air interface link (such as a link between the second node and the third node), such as air interface Uu LCID, ingress Uu LCID, or egress Uu LCID.

Eleventh indication information of a resource bearing user data. The information indicates a resource used to transfer data (such as data of the first node). The transferred data may be data sent by the third node to the second node, or data sent by the second node to the third node. The resource is a resource on the air interface link between the second node and the third node. The information is combined with the "tenth indication information of a resource bearing user data" to indicate the mapping between the resource on the air interface link and the resource on the sidelink. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer on an air interface link, and the indication information is identification information of the RLC bearer (such as RLC bearer ID, ingress RLC bearer ID, or egress RLC bearer ID).

Indication information of a data type. The information indicates the type of data carried by the resource indicated by the "eleventh indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

The aforementioned "fifth data configuration information" is configured to the second node to perform data mapping between a sidelink and an air interface link. Specifically, in an embodiment, after the second node receives the "fifth data configuration information", if the second node receives a data packet through the resource on the air interface link indicated by the "eleventh indication information of a resource bearing user data", optionally, the data packet includes one or more information indicated by the "fourth data packet information", then the second node will send the data packet through the resource on the sidelink indicated by the "tenth indication information of a resource bearing user data". In another embodiment, after the second node receives the "fifth data configuration information", if the second node receives a data packet through the resource on the sidelink indicated by the "tenth indication information of a resource bearing user data", optionally, the data packet includes one or more information indicated by the "fourth data packet information", then the second node will send the data packet through the resource on the air interface link indicated by the "eleventh indication information of a resource bearing user data".

At step 2-2, optionally, the third node sends a first configuration response message to the fourth node. The message is used to configure the transfer of user data. The message includes at least one of the following information:

User identification information of an F1 interface, such as gNB-CU UE F1AP ID, and/or gNB-DU UE F1AP ID. In an embodiment, the identification information is used to identify the first node, and further, the first configuration response message is a message for the first node. In another embodiment, the identification information is used to identify the second node, and further, the first configuration response message is a message for the second node.

Fourth data configuration information. In an embodiment, the information indicates configuration information for the data of the first node, and further, the information indicates the data of the first node accepted by the third node. In an embodiment, when the "first configuration response message" is for the first node, the "first configuration response message" may include the "fourth data configuration information". Further, the data specified by the configuration information is the data accepted by the third node. In another embodiment, the information indicates configuration information for the data of the second node, and further, the information indicates the data of the second node accepted by the third node (such as data of an air interface link, or data of a sidelink). The information includes at least one of the following information:

Identification information of a radio bearer, such as SRB ID, DRB ID, sidelink SRB ID, or sidelink DRB ID.

Identification information of an RLC channel, such as air interface link RLC channel ID, or sidelink RLC channel ID.

Identification information of an RLC bearer, such as air interface link RLC bearer ID, or sidelink RLC bearer ID.

Identification information of a logical channel, such as air interface link logical channel ID, or sidelink logical channel ID.

Information of a second tunnel. The information indicates information on the third node side. The information includes at least one of the following information:

Identification information of a tunnel. The information identifies a tunnel for bearing data. In an embodiment, the information may be included in a data packet.

Address information, such as IP address information.

Tunnel endpoint identification information, such as tunnel endpoint ID.

First resource configuration information. The first resource configuration information is about a configuration of a lower layer (such as a configuration of an RLC layer, an MAC layer, or a physical layer). The information includes configuration information of a resource required to transfer data. The configuration information may be for the air interface link of the first node, or may be for the configuration of the first node on the sidelink. The information included in the configuration information may refer to distributed unit to the central unit radio resource control information (DU to CU RRC Information) in TS38.473, or refer to cell group configuration CellGroupConfig, or SL-PHY-MAC-RLC-Config, or a new container in TS38.331. In an embodiment, the "first resource configuration information" may be included when the "first configuration response message" is for the first node. In an embodiment, the "first configuration response message" may include this information, and the fourth node may configure the information to the first node. In another embodiment, the "first resource configuration information" included in the "first configuration response message" is empty information (that is, does not include any information), then the fourth node does not need to modify the configuration specified by the "first resource configuration information" of the first node. In another embodiment, the third node may generate configuration information of the "first resource configuration information", but the third node will add indication information to the first configuration response message, and the function of the information is to inform the fourth node that the configuration can be ignored (that is, the configuration does not need to be sent to the first node). In an embodiment, if the "first configuration response message" is for the first node, the message may include this information. In another embodiment, when the "first configuration response message" is for the first node, the message may include this information, but the "first resource configuration information" is configuration information for the second node, that is, configuration information required when the second node serves the data of the first node. Therefore, the fourth node will not send this information to the first node. In this embodiment, the "first resource configuration information" may be resource configuration information for the second node, such as Relay UE DU to CU RRC Information or Relay UE CellGroupConfig, and this information is sent to the fourth node through the message for the first node. This is different from the prior art: in the prior art, the "first resource configuration information" received by the fourth node needs to be sent to the first node, but in this embodiment, when the fourth node learns that the first node accesses through other node (such as the second node), the fourth node can ignore the received "first resource configuration information", and then does not need to send the "first resource configuration information" to the first node, or sends the received "first resource configuration information" to the second node.

Second resource configuration information. The second resource configuration information is about a configuration of a lower layer (such as a configuration of an RLC layer, an MAC layer, or a physical layer). The information includes configuration information of a resource required to transfer data. The configuration information may be for the second node. Further, the configuration information may be for the air interface link of the second node. The information included in the configuration information may refer to DU to CU RRC Information in TS38.473, and may also refer to CellGroupConfig in TS38.331. In an embodiment, if the "first configuration response message" is for the first node, the message may include this information, which is different from the prior art. In the prior art, if the "first configuration response message" is for the first node, the DU to CU RRC Information or CellGroupConfig included in the message should be for the first node. Therefore, in order to distinguish from the prior art, the second resource configuration information may be named Relay UE DU to CU RRC Information or Relay UE CellGroupConfig, or indication information is added to this information to indicate that the second resource configuration information is for the second node (for example, indicate that the CellGroupConfig included in the first configuration response message is for the second node). In another embodiment, if the "first configuration response message" is for the second node, the message may include this information. In addition, the information may further include at least one of the following information (the information may be configured by the fourth node to the third node through the third data configuration information in step 2-1, or may be configured by the third node):

Fifth indication information of a resource bearing user data. The information indicates a resource used to transfer data (such as data of the first node), and the resource is a resource on the air interface link between the third node and the second node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer, and the indication information is identification information of the RLC bearer (such as RLC bearer ID, ingress RLC bearer ID, or egress RLC bearer ID).

Indication information of a data type. The information indicates the type of data carried by the resource indicated by the "fifth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Second data packet information. The information indicates information included in a data packet. In an embodiment, the information indicates information that needs to be included in a data packet when the second node sends data. In another embodiment, the information indicates information included in a data packet received by the second node. In addition, the information further includes information used when the second node receives and sends the data packet. The information includes at least one of the following information:

User identification information of a link. In an embodiment, the identification information identifies the first node on the link, and the information may be included in a data packet.

Identification information of a remote user. In an embodiment, the information identifies the first node, and the information may be included in a data packet.

User identification information of an F1 interface, such as gNB-CU UE F1AP ID, and/or gNB-DU UE F1AP ID. In an embodiment, the information identifies the first node, and the information may be included in a data packet.

Identification information of a bearer, such as DRB ID or SRB ID. The information may be included in a data packet.

Sixth data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID.

Identification information of a logical channel of a sidelink. The information indicates a logical channel used to transfer data on a sidelink (such as a link between the first node and the second node), such as sidelink LCID, ingress sidelink LCID, or egress sidelink LCID.

Identification information of a logical channel of an air interface link. The information indicates a logical channel used to transfer data on an air interface link (such as a link between the second node and the third node), such as Uu LCID, ingress Uu LCID, or egress Uu LCID.

Eighth indication information of a resource bearing user data. The information indicates a resource used to transfer data (such as data of the first node), and the resource is a resource on a sidelink between the second node and the first node. In an embodiment, the resource may be a channel on a sidelink (such as a Sidelink RLC channel), and the indication information is identification information of the sidelink RLC channel (such as Sidelink RLC CH ID, ingress Sidelink RLC CH ID, or egress Sidelink RLC CH ID). In another embodiment, the resource may be a bearer on a sidelink (such as Sidelink DRB, or Sidelink SRB), and the indication information is identification information of the sidelink bearer (such as sidelink RB ID, ingress sidelink RB ID, or egress sidelink RB ID). In another embodiment, the resource may be a logical channel on a sidelink, and the indication information is identification information of the sidelink logical channel (such as sidelink LCID, ingress sidelink LCID, or egress sidelink LCID). In another embodiment, the resource may be an RLC bearer on a sidelink, and the indication information is identification information of the RLC bearer on the sidelink (such as sidelink RLC bearer ID, egress sidelink RLC bearer ID, or ingress sidelink RLC bearer ID).

Indication information of a data type. The information indicates the type of data carried by the resource indicated by the "eighth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

The aforementioned "second resource configuration information" is configured to the second node to perform data mapping between a sidelink and an air interface link. Specifically, in an embodiment, after the second node receives the "second resource configuration information", if the second node receives a data packet through the resource on the air interface link indicated by the "fifth indication information of a resource bearing user data", optionally, the data packet includes one or more information indicated by the "second data packet information", then the second node will send the data packet through the resource on the sidelink indicated by the "eighth indication information of a resource bearing user data". In another embodiment, after the second node receives the "second resource configuration information", if the second node receives a data packet through the resource on the sidelink indicated by the "eighth indication information of a resource bearing user data", optionally, the data packet includes one or more information indicated by the "second data packet information", then the second node will send the data packet through the resource on the air interface link indicated by the "fifth indication information of a resource bearing user data."

Third resource configuration information. The third resource configuration information is about a configuration of a lower layer (such as a configuration of an RLC layer, an MAC layer, or a physical layer). The information includes configuration information of a resource required to transfer data. The configuration information may be for the second node. Further, the configuration information may be for the sidelink of the second node. The information included in the configuration information may refer to DU to CU RRC Information in TS38.473, and may also refer to SL-PHY-MAC-RLC-Config in TS38.331. Further, the information may further include mapping information between the air interface link and the sidelink, such as the "fifth data configuration information" included step 2-2 above.

At step 2-3, the fourth node sends a second configuration request message to the second node or the first node. The message is used to configure the first node or the second node, and then the first node can perform data transfer with the fourth node through the second node. In an embodiment, the second configuration request message is sent to the second node by the third node, or sent to the first node by the third node and/or the second node. The content included in the message may refer to RRCReconfiguration in TS38.331 or RRCConnectionReconfiguration message in TS36.331. In addition, the message may further include at least one of the following information:

First resource configuration information. The included information refers to the description in step 2-2 above, and the content may be the same as the content in the "first resource configuration information" of step 2-2.

Second resource configuration information. The included information refers to the description in step 2-2 above, and the content may be the same as the content in the "second resource configuration information" of step 2-2.

Third resource configuration information. The included information refers to the description in step 2-2 above, and the content may be the same as the content in the "third resource configuration information" of step 2-2.

Sixth indication information of a resource bearing user data. The information indicates a resource used to transfer data (such as data of the first node), and the resource is a resource on the air interface link between the third node and the second node. In an embodiment, the resource may be a channel (such as an RLC channel) on an air interface link, and the indication information is identification information of the RLC channel (such as RLC CH ID, ingress RLC CH ID, or egress RLC CH ID). In another embodiment, the resource may be a bearer (such as DRB, or SRB) on an air interface link, and the indication information is identification information of the bearer (such as RB ID, ingress RB ID, or egress RB ID). In another embodiment, the resource may be a logical channel on an air interface link, and the indication information is identification information of the logical channel (such as LCID, ingress LCID, or egress LCID). In another embodiment, the resource may be an RLC bearer, and the indication information is identification information of the RLC bearer (such as RLC bearer ID, ingress RLC bearer ID, or egress RLC bearer ID).

Indication information of a data type. The information indicates the type of data carried by the resource indicated by the "sixth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

Third data packet information. The information indicates information included in a data packet. In an embodiment, the information indicates information that needs to be included in a data packet when the second node sends data. In another embodiment, the information indicates information included in a data packet received by the second node. In addition, the information further includes information used when the second node receives and sends the data packet. The information includes at least one of the following information:

User identification information of a link. In an embodiment, the identification information identifies the first node on the link, and the information may be included in a data packet.

Identification information of a remote user. In an embodiment, the information identifies the first node, and the information may be included in a data packet.

User identification information of an F1 interface, such as gNB-CU UE F1AP ID, and/or gNB-DU UE F1AP ID. In an embodiment, the information identifies the first node, and the information may be included in a data packet.

Identification information of a bearer, such as DRB ID or SRB ID. The information may be included in a data packet.

Seventh data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID or bearer Index, or may have other names.

Identification information of a logical channel of a sidelink. The information indicates a logical channel used to transfer data on a sidelink (such as a link between the first node and the second node), such as sidelink LCID, ingress sidelink LCID, or egress sidelink LCID.

Identification information of a logical channel of an air interface link. The information indicates a logical channel used to transfer data on an air interface link (such as a link between the second node and the third node), such as Uu LCID, ingress Uu LCID, or egress Uu LCID.

Ninth indication information of a resource bearing user data. The information indicates a resource used to transfer data (such as data of the first node), and the resource is a resource on a sidelink between the second node and the first node. In an embodiment, the resource may be a channel on a sidelink (such as a Sidelink RLC channel), and the indication information is identification information of the sidelink RLC channel (such as Sidelink RLC CH ID, ingress Sidelink RLC CH ID, or egress Sidelink RLC CH ID). In another embodiment, the resource may be a bearer on a sidelink (such as Sidelink DRB, or Sidelink SRB), and the indication information is identification information of the sidelink bearer (such as sidelink RB ID, ingress sidelink RB ID, or egress sidelink RB ID). In another embodiment, the resource may be a logical channel on a sidelink, and the indication information is identification information of the sidelink logical channel (such as sidelink LCID, ingress sidelink LCID, or egress sidelink LCID). In another embodiment, the resource may be an RLC bearer on a sidelink, and the indication information is identification information of the RLC bearer on the sidelink (such as sidelink RLC bearer ID, egress sidelink RLC bearer ID, or ingress sidelink RLC bearer ID).

Indication information of a data type. The information indicates the type of data carried by the resource indicated by the "ninth indication information of a resource bearing user data", such as control plane data, user plane data, a signaling radio bearer, a data radio bearer, a Signaling Radio Bearer 1 (SRB1), a Signaling Radio Bearer 2 (SRB2), or a Signaling Radio Bearer 0 (SRB0).

After the second node receives the "second configuration request message", it can perform data mapping between a sidelink and an air interface link. Specifically, in an embodiment, if the second node receives a data packet through the resource on the air interface link indicated by the "sixth indication information of a resource bearing user data", optionally, the data packet includes one or more information indicated by the "third data packet information", then the second node will send the data packet through the resource on the sidelink indicated by the "ninth indication information of a resource bearing user data". In another embodiment, if the second node receives a data packet through the resource on the sidelink indicated by the "ninth indication information of a resource bearing user data", optionally, the data packet includes one or more information indicated by the "third data packet information", then the second node will send the data packet through the resource on the air interface link indicated by the "sixth indication information of a resource bearing user data". In an embodiment, when the central unit of the base station includes a control plane and a user plane, the method further includes a configuration for the user plane by the control plane, and the configuration is used to configure information added when the user plane sends a data packet.

Figure 12:
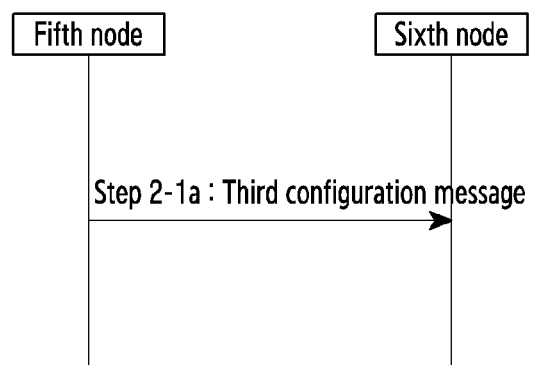
FIG. 12 is a schematic flowchart of data mapping configuration according to an embodiment of the disclosure.

FIG. 12 is a schematic flowchart of data mapping configuration according to an embodiment of the disclosure.

Referring to FIG. 12, at step 2-1*a*, the fifth node sends a third configuration request message to the sixth node. The message is used to configure the sixth node, so that the sixth node sends user data. In an embodiment, the message is for the second node. The message includes at least one of the following information:

Third tunnel mapping information. The information configures mapping information of a data packet transferred on a tunnel. In an embodiment, the tunnel is a downlink tunnel, which may be a tunnel for the second node. The information includes at least one of the following information:

Identification information of a tunnel. The information identifies a tunnel for bearing data.

Address information, such as IP address information.

Tunnel endpoint identification information, such as tunnel endpoint ID.

Configuration information of third data. The data is data of the first node. For a type of data, the information includes at least one of the following information:

Identification information of a bearer, such as DRB ID or SRB ID. The information may be included in a data packet.

User identification information of a link. In an embodiment, the identification information identifies the first node on the link, and the information may be included in the data packet when the sixth node sends data.

Identification information of a remote user. In an embodiment, the information identifies the first node, and the information may be included in a data packet.

Eighth data identification information. The information indicates data transferred by the third node (such as data sent by the third node to the second node, or data sent by the second node to the third node), such as data belonging to different bearers, and data belonging to different tunnels. In an embodiment, the information may be different from the "identification information of a bearer", such as adaptation layer bearer ID.

User identification information of an F1 interface, such as gNB-CU UE F1AP ID, and/or gNB-DU UE F1AP ID. In an embodiment, the information identifies the first node, and the information may be included in a data packet.

In an embodiment, one or more information in the "configuration information of third data" may be included in a data packet when the sixth node sends data.

In an embodiment, according to the above configuration (third tunnel mapping information), the sixth node can add relevant information to the sent data packet, so that the third node can learn the characteristics of the data packet and send the data packet to the second node through the configured resource.

In an embodiment, according to the above configuration (third tunnel mapping information), the transfer of user data (control plane data, or user plane data) may follow the following methods:

Uplink: the first node sends data to the second node on the sidelink according to the configuration, and the second node adds the configured information to a data packet according to the configuration, and sends the data packet to the third node through the configured resource on the air interface link. After receiving the data packet, the third node sends data to the fourth node according to the configuration by using a message for the first node or a tunnel for the first node; and Downlink: the fourth node sends data to the third node by using a message for the first node or a tunnel for the first node, and the third node adds the configured information to a data packet according to the configuration, and sends the data packet to the second node through the configured resource on the air interface link. After receiving the data packet, the second node selects an appropriate resource on the sidelink according to the information included in the data packet and sends the data packet to the first node.

The technical solution provided by the embodiment of the disclosure has at least the following beneficial effects:

The distributed unit of the base station and the relay terminal can learn the configuration used when transferring the data packet of user equipment. Specifically:

(1) The distributed unit of the base station can determine, according to the configuration, a resource used when sending data of user equipment, and determine information that needs to be added in the data packet when sending data;

(2) The distributed unit of the base station can determine, according to the configuration, that the received data is from the user equipment, and determine a message or tunnel used when sending user data to the central unit of the base station; and (3) The relay terminal can determine, according to the configuration, a resource of an air interface link and a resource of a sidelink used when sending data of user equipment, and determine that the data from the base station should be sent to which user equipment, or that the data from the user equipment should be sent through which resource of the air interface link, and what information needs to be added to the data packet.

In an embodiment, according to different configuration methods, the above process may be implemented in different ways (the specific description of the content of the information included in the process in the following implementations may refer to step 2-1/2-2/2-3/2-1*a* above):

Implementation 1: the mapping of user data to the Uu RLC channel of the relay terminal is configured through F1AP of the user equipment (the first node).

In this implementation, the fourth node and the third node use messages for the user equipment (the first node) for configuration, and the mapping information is configured according to the configuration of the user equipment (the first node). The process of implementation 1 is as follows:

In a Step, the fourth node sends a first configuration request message to the third node. The message includes at least one of the following information:

User identification information of an F1 interface, such as gNB-CU UE F1AP ID, and/or gNB-DU UE F1AP ID. The information is for the user equipment (first node).

First data configuration information. See step 2-1 above for specific content.

Third data configuration information. See step 2-1 above for specific content.

In a Step, optionally, the third node sends a first configuration response message to the fourth node. The message includes at least one of the following information:

User identification information of an F1 interface, such as gNB-CU UE F1AP ID, and/or gNB-DU UE F1AP ID. The information is for the user equipment.

Fourth data configuration information. See step 2-2 above for specific content.

First resource configuration information. The configuration is for the first node. See step 2-2 above for specific content.

Second resource configuration information. The configuration is for the first node. See step 2-2 above for specific content.

In a Step, the fourth node sends a second configuration request message to the second node or the first node. The message may include at least one of the following information:

First resource configuration information. The configuration is for the first node. See step 2-2 above for specific content.

Second resource configuration information. The configuration is for the first node. See step 2-2 above for specific content.

Third data packet information. See step 2-3 above for specific content.

Ninth indication information of a resource bearing user data. See step 2-3 above for specific content. The information includes configuration information for the data of the first node and mapping information of the data of the first node to the sidelink.

In this embodiment, the F1AP of the first node may be used to configure the mapping of control signaling, which specifically includes the following process:

In a Step, the fourth node sends a first configuration request message to the third node. The message includes at least one of the following information:

User identification information of an F1 interface, such as gNB-CU UE F1AP ID, and/or gNB-DU UE F1AP ID. The information is for the first node.

First data configuration information. See step 2-1. The information includes at least one of the following information:

Identification information of a radio bearer, such as SRB ID.

First mapping information.

First identification information of user data, such as SRB ID. In an embodiment, the radio bearer indicated by the information is the same as the radio bearer indicated by the "identification information of a radio bearer."

First indication information of a resource bearing user data.

First adaptation layer information.

After receiving the "first mapping information", the third node will map the data packet including the control message according to the information. In an embodiment, when the third node receives, from the fourth node, a data packet that belongs to the bearer indicated by the "first identification information of user data", the third node adds information to the data packet according to the "first adaptation layer information", and sends the data packet by using the resource indicated by the "first indication information of a resource bearing user data". In another embodiment, if the data packet received by the third node from the second node includes the information in the "first adaptation layer information", and optionally, if the data packet is received through the "first indication information of a resource bearing user data", the third node learns that the data packet includes data indicated by the "first identification information of user data", deletes the information in the "first adaptation layer information" included in the data packet, and then sends the data packet to the fourth node.

Third data configuration information. See step 2-1 above for specific content.

In a Step, optionally, the third node sends a first configuration response message to the fourth node. The message includes at least one of the following information:

User identification information of an F1 interface, such as gNB-CU UE F1AP ID, and/or gNB-DU UE F1AP ID. The information is for the user equipment.

First resource configuration information. See step 2-2 above for specific content.

Second resource configuration information. See step 2-2 above for specific content.

In a Step, the fourth node sends a second configuration request message to the second node or the first node. The message may include at least one of the following information:

Sixth indication information of a resource bearing user data. See step 2-3 above for specific content.

Third data packet information. See step 2-3 above for specific content.

Ninth indication information of a resource bearing user data. See step 2-3 above for specific content.

After the second node or the first node receives the "second configuration request message", it will map the data packet transfer according to the configuration in the message. The specific method may refer to the description in step 2-3 above.

In this embodiment, the F1AP of the first node may be used to configure the mapping of user plane data, which specifically includes the following process:

In a Step, the fourth node sends a first configuration request message to the third node. The message includes at least one of the following information:

User identification information of an F1 interface, such as gNB-CU UE F1AP ID, and/or gNB-DU UE F1AP ID. The information is for the first node.

First data configuration information. See step 2-1. The information includes at least one of the following information:

Identification information of a radio bearer, such as SRB ID.

First mapping information.

Information about the QoS of a radio bearer.

Information about a first tunnel. The information includes information of one or more tunnels. For a tunnel, the information includes at least one of the following information:

Tunnel identification information.
Address information.
Tunnel endpoint identification information.
Header information.
Indication information of a data transfer direction.
First tunnel mapping information.
First information of a data tunnel.
Second indication information of a resource bearing user data.
Second adaptation layer information.

After receiving the "first tunnel mapping information", the third node will perform a mapping including user plane data packets according to the information. In an embodiment, when the third node receives, from the fourth node, a data packet that belongs to the tunnel indicated by the "first information of a data tunnel", the third node adds information to the data packet according to the "second adaptation layer information", and sends the data packet by using the resource indicated by the "second indication information of a resource bearing user data". In another embodiment, if the data packet received by the third node from the second node includes the information in the "second adaptation layer information", and optionally, if the data packet is received through the "second indication information of a resource bearing user data", the third node learns that the data packet is a data packet of the tunnel indicated by the "first tunnel mapping information", deletes the information in the "second adaption layer information" included in the data packet, and then sends the data packet to the fourth node through the tunnel indicated by the "first tunnel mapping information."

Third data configuration information. See step 2-1 above for specific content.

In a Step, optionally, the third node sends a first configuration response message to the fourth node. The message includes at least one of the following information:
User identification information of an F1 interface, such as gNB-CU UE F1AP ID, and/or gNB-DU UE F1AP ID. The information is for the user equipment.
First resource configuration information. See step 2-2 above for specific content.
Second resource configuration information. See step 2-2 above for specific content.

In a Step, the fourth node sends a second configuration request message to the second node or the first node. The message may include at least one of the following information:
Sixth indication information of a resource bearing user data. See step 2-3 above for specific content.
Third data packet information. See step 2-3 above for specific content.
Ninth indication information of a resource bearing user data. See step 2-3 above for specific content.

After the second node or the first node receives the "second configuration request message", it will map the data packet transfer according to the configuration in the message. The specific method may refer to the description in step 2-3 above.

Implementation 2: the mapping of user data (data of the first node) to the Uu RLC channel of the relay terminal is configured through the F1AP of the relay terminal (the second node).

In implementation 2, the fourth node and the third node use messages for the relay terminal for configuration, and the mapping information is configured according to the configuration of the relay terminal. The process of implementation 2 is as follows:

In a Step, the fourth node sends a first configuration request message to the third node. The message includes at least one of the following information:
User identification information of an F1 interface, such as gNB-CU UE F1AP ID, and/or gNB-DU UE F1AP ID. The information is for the user equipment.
Second data configuration information. See step 2-1 above for specific content.
Third data configuration information. See step 2-1 above for specific content.

After receiving the "first configuration request message", the third node will map control plane data according to the "second mapping information" in the "second data configuration information", and map user plane data according to the "second tunnel mapping information" in the "second data configuration information."

In a Step, optionally, the third node sends a first configuration response message to the fourth node. The message includes at least one of the following information:
User identification information of an F1 interface, such as gNB-CU UE F1AP ID, and/or gNB-DU UE F1AP ID. The information is for the user equipment.
First resource configuration information. The configuration is for the second node. See step 2-2 above for specific content.
Second resource configuration information. The configuration is for the second node. See step 2-2 above for specific content.
Third resource configuration information. The configuration is for the second node. See step 2-2 above for specific content.

In a Step, the fourth node sends a second configuration request message to the second node or the first node. The message may include at least one of the following information:
First resource configuration information. The configuration is for the second node. See step 2-2 above for specific content.
Second resource configuration information. The configuration is for the second node. See step 2-2 above for specific content.
Third resource configuration information. The configuration is for the second node. See step 2-2 above for specific content.
Sixth indication information of a resource bearing user data. See step 2-3 above for specific content.
Third data packet information. See step 2-3 above for specific content.
Ninth indication information of a resource bearing user data. See step 2-3 above for specific content.

Implementation 3: the mapping of user data (data of the first node) to the Uu RLC channel of the relay terminal is configured through the F1AP of the relay terminal (second node), and the user plane of the central unit of the base station adds information about user equipment to a data packet to help the distributed unit of the base station to map data packets. The process of implementation 3 is as follows:

In a Step, the fourth node sends a first configuration request message to the third node. The message includes at least one of the following information:
User identification information of an F1 interface, such as gNB-CU UE F1AP ID, and/or gNB-DU UE F1AP ID. The information is for the user equipment.
Second data configuration information. See step 2-1 above for specific content.
Third data configuration information. See step 2-1 above for specific content.

In a Step, optionally, the third node sends a first configuration response message to the fourth node. The message includes at least one of the following information:
- User identification information of an F1 interface, such as gNB-CU UE F1AP ID, and/or gNB-DU UE F1AP ID. The information is for the user equipment.
- First resource configuration information. See step 2-2 above for specific content.
- Second resource configuration information. See step 2-2 above for specific content.
- Third resource configuration information. See step 2-2 above for specific content.

In a Step, when the fourth node includes the control plane of the central unit of the base station and the user plane of the central unit of the base station, this step further includes that the control plane of the central unit of the base station sends a third configuration request message to the user plane of the central unit of the base station. The message includes at least one of the following information:
- Third tunnel mapping information. See step 2-1*a* above for specific content.

In a Step, the fourth node sends a second configuration request message to the second node or the first node. The message may include at least one of the following information:
- Sixth indication information of a resource bearing user data. See step 2-3 above for specific content.
- Third data packet information. See step 2-3 above for specific content.
- Ninth indication information of a resource bearing user data. See step 2-3 above for specific content.

Implementation 4: mapping information used for sending control signaling is configured through a message including the control signaling.

In implementation 4, the fourth node may configure the mapping through an F1AP message (such as an RRC message) of the first node or the second node that includes control signaling. This implementation includes the following process:

At step 2-1, the fourth node sends a first configuration request message to the third node. The message includes at least one of the following information:
- User identification information of an F1 interface, such as gNB-CU UE F1AP ID, and/or gNB-DU UE F1AP ID. The information may be for the first node or for the second node.
- First data configuration information. The information includes at least one of the following information:
- Identification information of a radio bearer, such as SRB ID, or DRB ID.
- Fourth container.
- First mapping information.
- Second data configuration information. The information includes at least one of the following information:
- Third indication information of a resource bearing user data.
- Fifth container.
- Second mapping information.

The specific content of the above information may refer to step 2-1 above.

Implementation 5: the relay terminal is configured through the F1AP of the relay terminal (second node), and the user equipment is configured through the F1AP of the user equipment (first node), to complete the configuration of the relay terminal to transfer user data.

In a Step, the fourth node sends a first message to the third node. The message is for the configuration of the relay terminal (second node). The message includes at least one of the following information:
- User identification information of an F1 interface, such as gNB-CU UE F1AP ID, and/or gNB-DU UE F1AP ID. The information is for the user equipment.
- Second data configuration information. The configuration is for the second node. See step 2-1 above for specific content.
- Third data configuration information. The configuration is for the second node. See step 2-1 above for specific content.

In a Step, optionally, the third node sends a first response message to the fourth node. The message includes at least one of the following information:
- User identification information of an F1 interface, such as gNB-CU UE F1AP ID, and/or gNB-DU UE F1AP ID. The information is for the user equipment.
- First resource configuration information. The configuration is for the second node. See step 2-2 above for specific content.
- Second resource configuration information. The configuration is for the second node. See step 2-2 above for specific content.
- Third resource configuration information. The configuration is for the second node. See step 2-2 above for specific content.

In a Step, the fourth node sends a second request message to the second node. The message may include at least one of the following information:
- First resource configuration information. The configuration is for the second node. See step 2-2 above for specific content.
- Second resource configuration information. The configuration is for the second node. See step 2-2 above for specific content.
- Third resource configuration information. The configuration is for the second node. See step 2-2 above for specific content.
- Sixth indication information of a resource bearing user data. See step 2-3 above for specific content.
- Third data packet information. See step 2-3 above for specific content.
- Ninth indication information of a resource bearing user data. See step 2-3 above for specific content.

In a Step, the fourth node sends a third request message to the third node. The message is for the user equipment (first node). The message includes at least one of the following information:
- User identification information of an F1 interface, such as gNB-CU UE F1AP ID, and/or gNB-DU UE F1AP ID. The information is for the user equipment (first node).
- First data configuration information. The configuration is for the first node. See step 2-1 above for specific content.
- Third data configuration information. The configuration is for the first node. See step 2-1 above for specific content.

In a Step, optionally, the third node sends a third response message to the fourth node. The message includes at least one of the following information:
- User identification information of an F1 interface, such as gNB-CU UE F1AP ID, and/or gNB-DU UE F1AP ID. The information is for the user equipment.
- Fourth data configuration information. The configuration is for the first node. See step 2-2 above for specific content.

First resource configuration information. The configuration is for the first node. See step 2-2 above for specific content.

Second resource configuration information. The configuration is for the first node. See step 2-2 above for specific content.

In a Step: the fourth node sends a fourth request message to the first node. The message may include at least one of the following information:

First resource configuration information. The configuration is for the first node. See step 2-2 above for specific content.

Third data packet information. See step 2-3 above for specific content.

Ninth indication information of a resource bearing user data. See step 2-3 above for specific content. Different from the information in another step, the information includes configuration information for the data of the first node and mapping information of the data of the first node to the sidelink.

As an example, the aforementioned messages may be the following possible messages, but may also be other messages:

First configuration request message, such as F1AP UE CONTEXT SETUP/MODIFICATION REQUEST message, or DL RRC MESSAGE TRANSFER message.

First configuration response message, such as F1AP UE CONTEXT SETUP/MODIFICATION RESPONSE message.

Second configuration request message, such as RRCReconfiguration message, or RRCConnectionReconfiguration message.

Third configuration request message, such as E1AP Bearer Context Setup/Modification Request message.

Third aspect of the disclosure: access mechanism of user equipment.

In order to support Sidelink relay, the data transfer of user equipment needs the assistance of a relay terminal. However, when the relay terminal does not have enough resources to serve the user equipment, or the base station does not have enough resources to support the relay of the sidelink, if the user equipment continues to transfer data in this way, the performance of user data transfer will be greatly affected, for example, the transfer rate is not up to the standard, the transfer delay is large, etc. When resources are in shortage, the user equipment should avoid using the relay terminal to maintain communication with the base station.

FIG. 13 is a schematic flowchart of data transfer according to an embodiment of the disclosure.

Referring to FIG. 13, an embodiment of the disclosure provides a method executed by a fourth node. The method includes:

At step S501, a fourth configuration request message is sent to a second node to indicate the second node to prohibit the access of a first node.

In an embodiment, the fourth configuration request message includes at least one of the following:

indication information for prohibiting the access of the first node; and time information when prohibiting the access of the first node.

The technical solution provided by the embodiment of the disclosure has at least the following beneficial effect:

The second node prohibits the access of the first node, which avoids the performance degradation of data transfer of the first node.

Figure 14:
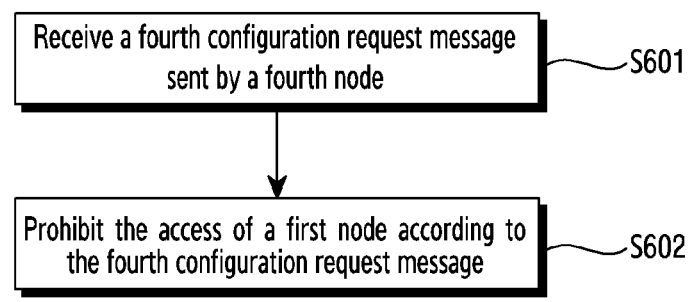
FIG. 14 is a schematic flowchart of data transfer according to an embodiment of the disclosure.

FIG. 14 is a schematic flowchart of data transfer according to an embodiment of the disclosure.

Referring to FIG. 14, an embodiment of the disclosure provides a method executed by a second node. The method includes:

At step S601, a fourth configuration request message sent by a fourth node is received.

At step S602, the access of a first node is prohibited according to the fourth configuration request message.

The technical solution provided by the embodiment of the disclosure has at least the following beneficial effects:

The second node prohibits the access of the first node, which avoids the performance degradation of data transfer of the first node.

Figure 15:
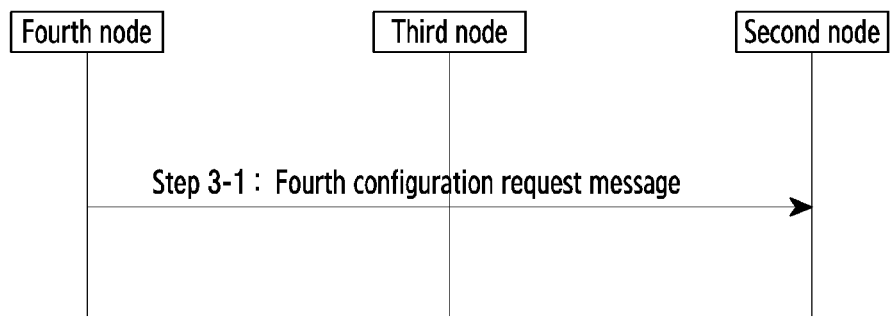
FIG. 15 is a schematic flowchart of configuring an access of user equipment according to an embodiment of the disclosure.

FIG. 15 is a schematic flowchart of configuring access of user equipment according to an embodiment of the disclosure.

Referring to FIG. 15, a third aspect of the disclosure provides a method for configuring the access of user equipment. The method includes:

At step 3-1, the fourth node sends a fourth configuration request message to the second node. The message is used to configure, to the second node, information related to the access of user equipment. The message may be sent to the second node through the third node. The message includes at least one of the following information:

Indication information for prohibiting the access of user equipment. The information is used to inform the second node of prohibiting the communication of more user equipment with the base station by means of sidelink relay.

Time information for prohibiting the access of user equipment. The information indicates the length of time for prohibiting the access of user equipment.

In an embodiment, after receiving the fourth configuration request message, the second node prohibits the access of user equipment, for example, the second node stops sending a discovery message.

In an embodiment, one implementation manner of the fourth configuration request message is an RRC message, such as an RRCReconfiguration message, then the fourth node sends the message to the second node through the third node. The other implementation manner is a system message, such as SIB1, then the fourth node broadcasts the message to the second node through the third node.

The technical solution provided by the embodiment of the disclosure has at least the following beneficial effect:

Under the condition that resources are limited, the base station can prohibit the access of user equipment to the network through the relay terminal, which avoids the performance degradation of data transfer of the user equipment.

Figure 16:
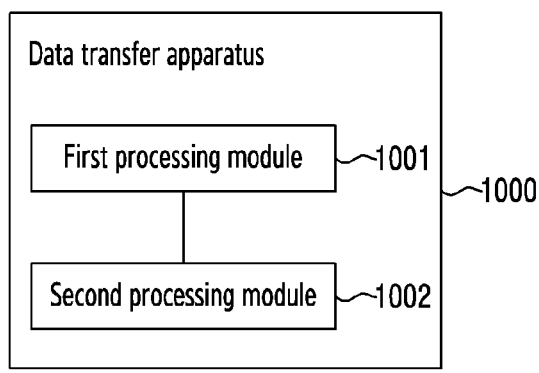
FIG. 16 is a schematic structural diagram of a third node according to an embodiment of the disclosure.

FIG. 16 is a schematic structural diagram of a third node according to an embodiment of the disclosure.

Referring to FIG. 16, based on the same concept as the foregoing embodiment, an embodiment of the disclosure further provides an apparatus, which is applied to a third node. An apparatus 1000 includes a first processing module 1001 and a second processing module 1002.

The first processing module 1001 is configured to send a first request message to a fourth node; and The second processing module 1002 is configured to receive a first response message sent by the fourth node, the first response message being indicative of connection of a first node to the fourth node through a second node.

In an embodiment, the first request message includes at least one of the following:

user identification information of an F1 interface, the user identification information of the F1 interface being used to identify at least one of the first node and the second node;

first identification information of the first node, the first identification information being used to identify the first node on a link;

second identification information of the first node;

third identification information of the first node;

fourth identification information of the first node;

first indication information of the first node;

identification information of the second node;

a first container, the first container including a third request message sent by the first node; and a second container, the second container including at least one of the third request message sent by the first node, the first identification information, and the second identification information.

In an embodiment, the first response message includes at least one of the following:

user identification information of the F1 interface, the user identification information of the F1 interface being used to identify at least one of the first node and the second node;

first identification information of the first node, the first identification information being used to identify the first node on the link;

second identification information of the first node;

identification information of the second node; and a third container, the third container including a response message in response to the third request message sent by the first node.

In an embodiment, before a first request message is sent to a fourth node, the method further includes:

A second request message sent by the second node is received, the second request message including the third request message sent by the first node to the second node;

The third request message includes at least one of the following:

first identification information of the first node, the first identification information being used to identify the first node on the link; and second identification information of the first node.

In an embodiment, the third request message is a connection setup request message sent by the first node.

In an embodiment, after a first response message sent by the fourth node is received, the method further includes:

A second response message is sent to the second node, so that the second node sends a third response message to the first node, the third response message including the response message in response to the third request message sent by the first node;

The second response message includes at least one of the following:

first identification information of the first node, the first identification information being used to identify the first node on the link;

second identification information of the first node;

third identification information of the first node;

fourth identification information of the first node; and the response message in response to the third request message sent by the first node.

In an embodiment, fourth request information sent by the fourth node is received, the fourth request information being used to configure a resource used when the second node transfers data of the first node; and a fourth response message is sent to the fourth node, the fourth response message being used to transfer configuration information generated by the third node.

In an embodiment, the fourth request information includes at least one of the following:

first identification information of the first node, the first identification information being used to identify the first node on the link;

second identification information of the first node, the second identification information being used to identify the first node;

third identification information of the first node;

fourth identification information of the first node; and information about a bearer or resource, the bearer being used to transfer data of the first node.

The information about a bearer or resource includes at least one of the following:

identification information of the bearer or identification information of the resource;

QoS parameter information of the bearer or QoS parameter information of the resource;

indication information of a default bearer or indication information of the resource;

indication information for setting up the default bearer or indication information for the resource; and indication information of a user to which the data of the first node belongs.

In an embodiment, the fourth response message includes at least one of the following:

configuration information of a radio link control (RLC) layer;

configuration information of a logical channel;

first identification information of the first node, the first identification information being used to identify the first node on the link;

second identification information of the first node, the identification information of a second user being used to identify the first node; and first default configuration information or first general configuration information.

In an embodiment, the first configuration message includes at least one of the following:

identification information of a user served by the second node;

configuration information of an air interface link, the air interface link being a link between the second node and the third node; and second default configuration information or second general configuration information.

The technical solution provided by the embodiment of the disclosure has at least the following beneficial effect:

A connection is established between the first node and the fourth node through the second node.

Figure 17:
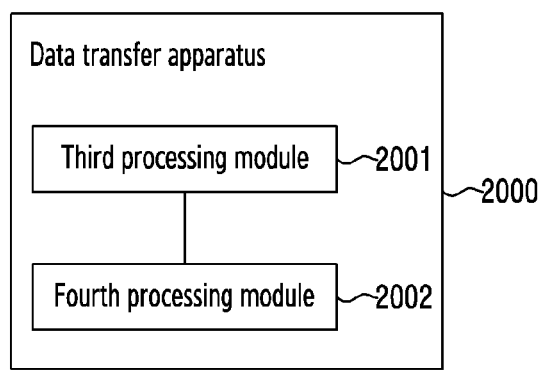
FIG. 17 is a schematic structural diagram of a fourth node according to an embodiment of the disclosure.

FIG. 17 is a schematic structural diagram of a fourth node according to an embodiment of the disclosure.

Referring to FIG. 17, based on the same concept as the foregoing embodiment, an embodiment of the disclosure further provides an apparatus (e.g., a data transfer apparatus), which is applied to a fourth node. A data transfer apparatus 2000 includes a third processing module 2001 and a fourth processing module 2002.

The third processing module 2001 is configured to receive a first request message sent by a third node; and The fourth processing module 2002 is configured to send a first response message to the third node, the first response message being indicative of connection of a first node to the fourth node through a second node.

In an embodiment, a first configuration message is sent to the second node, the first configuration message being used to configure data transfer between the second node and other first nodes except the first node.

The technical solution provided by the embodiment of the disclosure has at least the following beneficial effect:

A connection is established between the first node and the fourth node through the second node.

Figure 18:
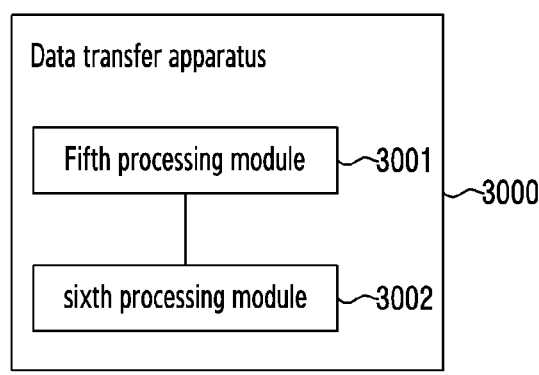
FIG. 18 is a schematic structural diagram of a third node according to an embodiment of the disclosure.

FIG. 18 is a schematic structural diagram of a third node according to an embodiment of the disclosure.

Referring to FIG. 18, based on the same concept as the foregoing embodiment, an embodiment of the disclosure further provides an apparatus (e.g., a data transfer apparatus), which is applied to a third node. A data transfer apparatus 3000 includes a fifth processing module 3001 and a sixth processing module 3002.

The fifth processing module 3001 is configured to receive a first configuration request message sent by a fourth node; and The sixth processing module 3002 is configured to send a first configuration response message to the fourth node, the first configuration request message and the first configuration response message including configuration for data transfer of a first node through a second node.

In an embodiment, the first configuration request message includes at least one of the following:
user identification information of an F1 interface, the user identification information of the F1 interface being used to identify at least one of the first node and the second node;
first configuration information, the first configuration information being about a configuration performed when the first node is configured;
second configuration information, the second configuration information being about a configuration used when the second node is configured; and
third configuration information, the third configuration information being configuration information required to notify the generation of configuration of the second node.

In an embodiment, the first configuration information includes at least one of the following:
identification information of a radio bearer;
information about the quality of service (QoS) of the radio bearer;
a fourth container, the fourth container including a control signaling message or a packet data convergence protocol service data unit (PDCP PDU), and the PDCP PDU including the control signaling message;
first mapping information; and
information about a first tunnel, the information about the first tunnel being indicative of information about the fourth node.

In an embodiment, the first mapping information includes at least one of the following:
first identification information of user data;
first adaptation layer information; and
first indication information, the first indication information being indicative of a resource used to transfer data.

In an embodiment, the information about the first tunnel includes at least one of the following:
identification information of the first tunnel;
address information of the first tunnel;
endpoint identification information of the first tunnel;
header information for a data packet;
indication information of a data transfer direction; and
first tunnel mapping information.

In an embodiment, the first tunnel mapping information includes at least one of the following:
first information of a data tunnel;
second adaptation layer information; and
second indication information, the second indication information being indicative of a resource used to transfer data.

In an embodiment, the second configuration information includes at least one of the following:
third indication information, the third indication information being indicative of a resource used to transfer data;
QoS information of user data;
a fifth container, the fifth container including a control signaling message or a PDCP PDU, and the PDCP PDU including the control signaling message;
second mapping information; and
second tunnel mapping information, the second tunnel mapping information being indicative of data carried by the resource indicated by the third indication information.

In an embodiment, the second mapping information includes at least one of the following:
second identification information of user data; and
third adaptation layer information.

In an embodiment, the second tunnel mapping information includes at least one of the following:
fourth adaptation layer information; and
information of a first tunnel.

In an embodiment, the information of the first tunnel includes at least one of the following:
identification information of the first tunnel;
address information of the first tunnel;
endpoint identification information of the first tunnel;
header information for a data packet; and
indication information of a data transfer direction.

In an embodiment, the third configuration information includes at least one of the following:
fourth indication information, the fourth indication information being indicative of a resource used to transfer data;
first data packet information; and
seventh indication information of a resource bearing user data.

In an embodiment, the first data packet information includes at least one of the following:
user identification information of an F1 interface, the user identification information of the F1 interface being used to identify at least one of the first node and the second node;
first identification information of the first node, the first identification information being used to identify the first node on the link;
second identification information of the first node, the second identification information being used to identify the first node;
identification information of a radio bearer;
fifth data identification information;
identification information of a logical channel of a sidelink; and
identification information of a logical channel of an air interface link.

In an embodiment, the first configuration response message includes at least one of the following:
user identification information of an F1 interface, the user identification information of the F1 interface being used to identify at least one of the first node and the second node;

fourth configuration information, the fourth configuration information being indicative of configuration information of data for the first node;

first resource configuration information for the first node;

second resource configuration information for the second node; and third resource configuration information.

In an embodiment, the fourth configuration information includes at least one of the following:

identification information of a radio bearer; and information of a second tunnel.

In an embodiment, the information of the second tunnel includes at least one of the following:

identification information of the second tunnel;

address information of the second tunnel; and endpoint identification information of the second tunnel.

In an embodiment, the second resource configuration information includes at least one of the following:

fifth indication information, the fifth indication information being indicative of a resource used to transfer data;

second data packet information; and eighth indication information of a resource bearing user data.

In an embodiment, the second data packet information includes at least one of the following:

user identification information of an F1 interface, the user identification information of the F1 interface being used to identify at least one of the first node and the second node;

first identification information of the first node, the first identification information being used to identify the first node on the link;

second identification information of the first node, the second identification information being used to identify the first node;

identification information of a radio bearer;

sixth data identification information;

identification information of a logical channel of a sidelink; and identification information of a logical channel of an air interface link.

The technical solution provided by the embodiment of the disclosure has at least the following beneficial effect:

The configuration of data transfer of the first node is realized.

Figure 19:
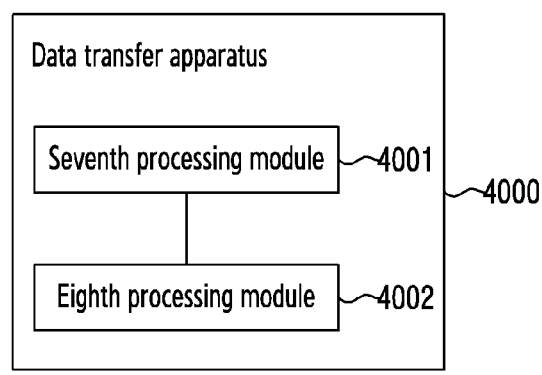
FIG. 19 is a schematic structural diagram of a fourth node according to an embodiment of the disclosure.

FIG. 19 is a schematic structural diagram of a fourth node according to an embodiment of the disclosure.

Referring to FIG. 19, based on the same concept as the foregoing embodiment, an embodiment of the disclosure further provides an apparatus (e.g., a data transfer apparatus), which is applied to a fourth node. A data transfer apparatus 4000 includes a seventh processing module 4001 and an eighth processing module 4002.

The seventh processing module 4001 is configured to send a first configuration request message to a third node; and The eighth processing module 4002 is configured to receive a first configuration response message sent by the third node, the first configuration request message and the first configuration response message including configuration for data transfer of a first node through a second node.

In an embodiment, the seventh processing module 4001 is further configured to send a second configuration request message to the first node or the second node, the second configuration request message being used to configure data transfer of the first node or the second node.

In an embodiment, the fourth node includes a fifth node and a sixth node, which is characterized by further including:

the fifth node transferring a third configuration request message to the sixth node, the third configuration request message being used to configure data transfer of the sixth node.

The technical solution provided by the embodiment of the disclosure has at least the following beneficial effect:

The configuration of data transfer of the first node is realized.

Figure 20:
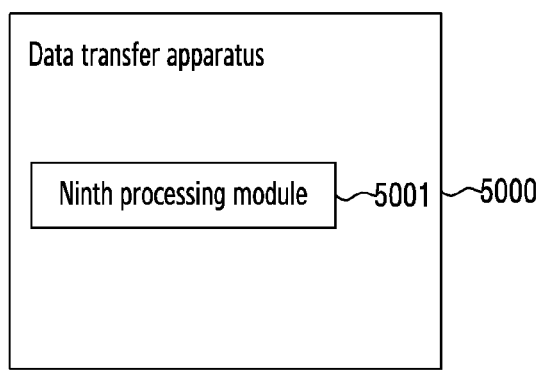
FIG. 20 is a schematic structural diagram of a fourth node according to an embodiment of the disclosure.

FIG. 20 is a schematic structural diagram of a fourth node according to an embodiment of the disclosure.

Referring to FIG. 20, based on the same concept as the foregoing embodiment, an embodiment of the disclosure further provides an apparatus (e.g., a data transfer apparatus), which is applied to a fourth node. A data transfer apparatus 5000 includes a ninth processing module 5001.

The ninth processing module is configured to send a fourth configuration request message to a second node to indicate the second node to prohibit the access of a first node.

In an embodiment, the fourth configuration request message includes at least one of the following:

indication information for prohibiting the access of the first node; and time information when prohibiting the access of the first node.

The technical solution provided by the embodiment of the disclosure has at least the following beneficial effect:

The second node prohibits the access of the first node, which avoids the performance degradation of data transfer of the first node.

Figure 21:
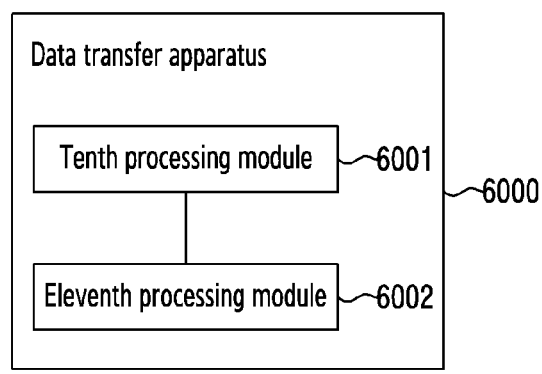
FIG. 21 is a schematic structural diagram of a second node according to an embodiment of the disclosure.

FIG. 21 is a schematic structural diagram of a second node according to an embodiment of the disclosure.

Referring to FIG. 21, based on the same concept as the foregoing embodiment, an embodiment of the disclosure further provides an apparatus (e.g., a data transfer apparatus), which is applied to a second node. A data transfer apparatus 6000 includes a tenth processing module 6001 and an eleventh processing module 6002.

The tenth processing module is configured to receive a fourth configuration request message sent by a fourth node; and The eleventh processing module is configured to prohibit the access of a first node according to the fourth configuration request message.

The technical solution provided by the embodiment of the disclosure has at least the following beneficial effect:

The second node prohibits the access of the first node, which avoids the performance degradation of data transfer of the first node.

Figure 22:
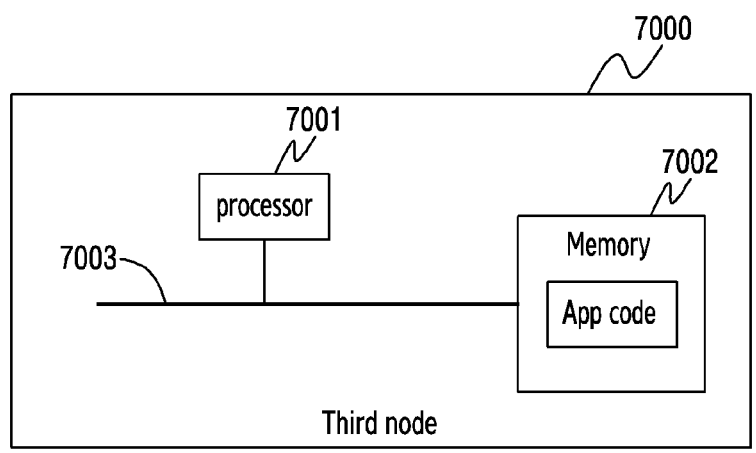
FIG. 22 is a schematic structural diagram of a third node according to an embodiment of the disclosure.

FIG. 22 is a schematic structural diagram of a third node according to an embodiment of the disclosure.

Referring to FIG. 22, based on the same concept, an embodiment of the disclosure further provides a third node (e.g., electronic device). An electronic device 7000 includes at least one processor 7001, a memory 7002, and a bus 7003, wherein the at least one processor 7001 is electrically connected to the memory 7002; and the memory 7002 is configured to store at least one computer-executable instruction, and the at least one processor 7001 is configured to execute the at least one computer-executable instruction, so as to execute the steps of any method provided by an example or any optional embodiment.

Figure 23:
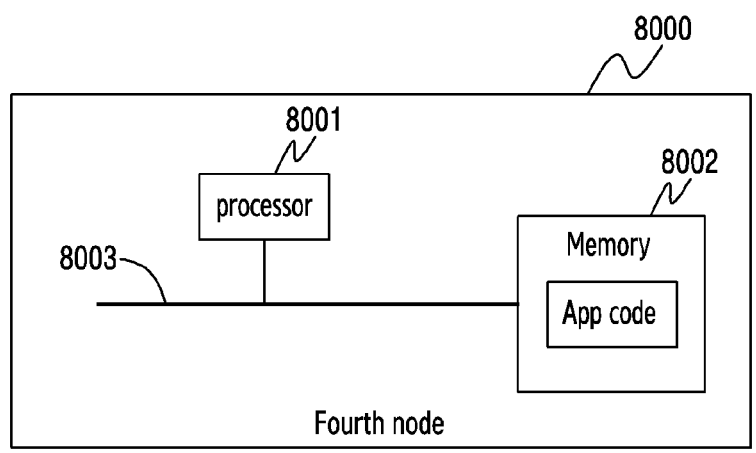
FIG. 23 is a schematic structural diagram of a fourth node according to an embodiment of the disclosure.

FIG. 23 is a schematic structural diagram of a fourth node according to an embodiment of the disclosure.

Referring to FIG. 23, based on the same concept, an embodiment of the disclosure further provides a fourth node (e.g., electronic device). An electronic device 8000 includes at least one processor 8001, a memory 8002, and a bus 8003, wherein the at least one processor 8001 is electrically connected to the memory 8002; and the memory 8002 is configured to store at least one computer-executable instruction, and the at least one processor 8001 is configured to execute the at least one computer-executable instruction, so as to execute the steps of any method provided by an example or any optional embodiment.

Figure 24:
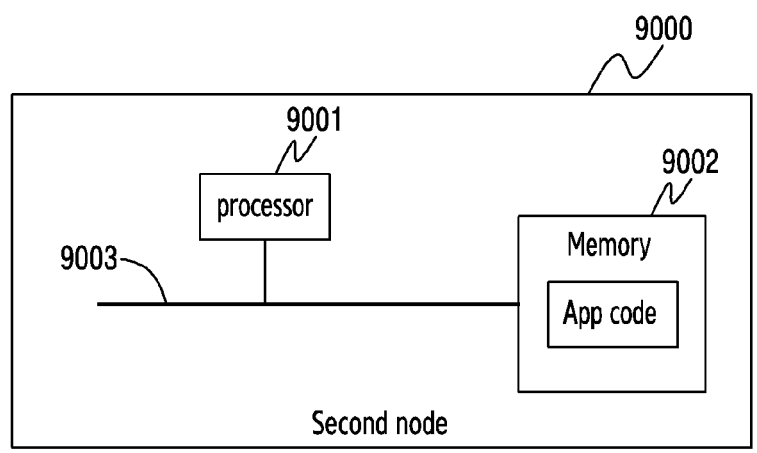
FIG. 24 is a schematic structural diagram of a second node according to an embodiment of the disclosure.

FIG. 24 is a schematic structural diagram of a second node according to an embodiment of the disclosure.

Referring to FIG. 24, based on the same concept, an embodiment of the disclosure further provides a second node (e.g., electronic device). An electronic device 9000 includes at least one processor 9001, a memory 9002, and a bus 9003, wherein the at least one processor 9001 is electrically connected to the memory 9002; and the memory 9002 is configured to store at least one computer-executable instruction, and the at least one processor 9001 is configured to execute the at least one computer-executable instruction, so as to execute the steps of any method provided by an example or any optional embodiment.

Based on the same concept, an embodiment of the disclosure further provides another computer-readable storage medium, storing a computer program that is used to implement the steps of any method provided by an example or any optional embodiment when executed by a processor.

The computer-readable storage medium provided by the embodiment of the disclosure includes, but is not limited to, any type of disk (including floppy disk, hard disk, optical disk, CD-ROM, and magneto-optical disk), Read-Only Memory (ROM), Random Access Memory (RAM), Erasable Programmable Read-Only Memory (EPROM), Electrically Erasable Programmable Read-Only Memory (EEPROM), flash memory, magnetic card or light card. That is, the readable storage medium includes any medium that stores or transfers information in a readable form by a device (such as a computer).

Those skilled in the art can understand that computer program instructions can be used to implement each block in these structural diagrams and/or block diagrams and/or flowcharts and combinations of blocks in these structural diagrams and/or block diagrams and/or flowcharts. Those skilled in the art can understand that these computer program instructions can be provided to processors of general-purpose computers, professional computers, or other programmable data processing methods for implementation, so that the computer or other programmable data processing method processors can execute the blocks in the structural diagrams and/or block diagrams and/or flowcharts of the disclosure or schemes specified in multiple blocks.

Those skilled in the art can understand that the steps, measures, and solutions in various operations, methods, and processes that have been discussed in the disclosure can be alternated, changed, combined, or deleted. Further, other steps, measures, and solutions in various operations, methods, and processes that have been discussed in the disclosure can also be alternated, changed, rearranged, decomposed, combined, or deleted. Further, the steps, measures, and solutions in various operations, methods, and processes of the disclosure in the prior art can also be alternated, changed, rearranged, decomposed, combined, or deleted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a gNodeB (gNB) comprising a distributed unit (DU) and a centralized unit (CU) in a wireless communication system, the method comprising:
    receiving, from a second user equipment (UE), a request message of a first UE and an identifier of the first UE, wherein the request message is associated with initial access of the first UE to the gNB via the second UE;
    transmitting, by the DU, an initial uplink (UL) radio resource control (RRC) message transfer message for allowing the first UE to access to the gNB to the CU, the initial UL RRC message transfer message including Sidelink Relay Configuration information associated with the first UE and the second UE,
    wherein the Sidelink Relay Configuration information includes the identifier of the first UE, an identifier of the second UE identifying the second UE over F1 interface within the DU, and configuration on a sidelink between the first UE and the second UE;
    receiving, by the DU, a context modification request message including information for configuring a radio bearer and information for configuring a channel from the CU, the channel including a first channel between the second UE and the gNB and a second channel between the first UE and the second UE;
    transmitting, by the DU, a context modification response message as a response to the context modification request message to the CU, the context modification response message includes information associated with the configured channel including an identifier of the first channel, and an identifier of the second channel; and
    transmitting, by the DU, a response message as a response to the request message of the first UE to the second UE.

2. The method of claim 1, wherein the information for configuring the radio bearer includes an identifier of the radio bearer, and information associated with mapping of data of the radio bearer to the first channel.

3. The method of claim 2,
    wherein the information for configuring the channel includes first information on the first channel and second information on the second channel,
    wherein the first information includes the identifier of the first channel, information on a quality of service associated with user data of the first channel, and information on a data type associated with a control plane data of the first channel, and
    wherein the second information includes the identifier of the second channel, the identifier of the first UE, information on a quality of service associated with user data of the second channel, and information on a data type associated with a control plane data of the second channel.

4. The method of claim 2,
    wherein the first channel is a radio link control (RLC) channel,
    wherein the second channel is a sidelink RLC channel, and
    wherein the radio bearer includes signaling radio bearer (SRB) and data radio bearer (DRB).

5. The method of claim 2, further comprising:
    transmitting, to the second UE, configuration information associated with UE-to-network (U2N) relay operation, the configuration information including information for identification of at least one first UE.

6. The method of claim 5, wherein the configuration information further includes information on an identifier of the radio bearer associated with the second UE, information on the first channel, and information on the second channel.

7. A method performed by a second user equipment (UE) in a wireless communication system, the method comprising:
receiving, from a first user equipment (UE), a request message associated with initial access of the first UE to a gNodeB (gNB) via the second UE;
transmitting, to a gNodeB (gNB), the request message of the first UE and an identifier of the first UE,
wherein the identifier of the first UE is included in Sidelink Relay Configuration information associated with the first UE and the second UE,
wherein the Sidelink Relay Configuration information is included in an initial uplink (UL) radio resource control (RRC) message transfer message which is transmitted by a distributed unit (DU) of the gNB to a centralized unit (CU) of the gNB for allowing the first UE to access to the gNB;
receiving, from the gNB, a response message as a response to the request message of the first UE to the second UE; and
transmitting, to the first UE, the response message.

8. The method of claim 7, wherein the Sidelink Relay Configuration information further includes an identifier of the second UE identifying the second UE over F1 interface within the DU, and configuration on a sidelink between the first UE and the second UE.

9. The method of claim 7, further comprising:
receiving, from the gNB, configuration information associated with UE-to-network (U2N) relay operation, the configuration information including information for identification of at least one first UE.

10. The method of claim 9, wherein the configuration information further includes information on an identifier of a radio bearer associated with the second UE, information on a first channel between the second UE and the gNB, and information on a second channel between the first UE and the second UE.

11. A gNodeB (gNB) in a wireless communication system, the gNB comprising:
a transceiver;
a distributed unit (DU);
a centralized unit (CU); and
a controller coupled with the transceiver and configured to:
receive, from a second user equipment (UE), a request message of a first UE and an identifier of the first UE, wherein the request message is associated with initial access of the first UE to the gNB via the second UE,
transmit, by the DU, an initial uplink (UL) radio resource control (RRC) message transfer message for allowing the first UE to access to the gNB to the CU, the initial UL RRC message transfer message including Sidelink Relay Configuration information associated with the first UE and the second UE,
wherein the Sidelink Relay Configuration information includes the identifier of the first UE, an identifier of the second UE identifying the second UE over F1 interface within the DU, and configuration on a sidelink between the first UE and the second UE,
receive, by the DU, a context modification request message including information for configuring a radio bearer and information for configuring a channel from the CU, the channel including a first channel between the second UE and the gNB and a second channel between the first UE and the second UE,
transmit, by the DU, a context modification response message as a response to the context modification request message to the CU, the context modification response message includes information associated with the configured channel including an identifier of the first channel, and an identifier of the second channel, and
transmit, by the DU, a response message as a response to the request message of the first UE to the second UE.

12. The gNB of claim 11, wherein the information for configuring the radio bearer includes an identifier of the radio bearer, and information associated with mapping of data of the radio bearer to the first channel.

13. The gNB of claim 12,
wherein the information for configuring the channel includes first information on the first channel and second information on the second channel,
wherein the first information includes the identifier of the first channel, information on a quality of service associated with user data of the first channel, and information on a data type associated with a control plane data of the first channel, and
wherein the second information includes the identifier of the second channel, the identifier of the first UE, information on a quality of service associated with user data of the second channel, and information on a data type associated with a control plane data of the second channel.

14. The gNB of claim 12,
wherein the first channel is a radio link control (RLC) channel,
wherein the second channel is a sidelink RLC channel, and
wherein the radio bearer includes signaling radio bearer (SRB) and data radio bearer (DRB).

15. A second user equipment (UE) in a wireless communication system, the second UE comprising:
a transceiver; and
a controller coupled with the transceiver and configured to:
receive, from a first UE, a request message associated with initial access of the first UE to a gNodeB (gNB), via the second UE,
transmit, to the gNB, the request message of the first UE and an identifier of the first UE,
wherein the identifier of the first UE is included in Sidelink Relay Configuration information associated with the first UE and the second UE,
wherein the Sidelink Relay Configuration information is included in an initial uplink (UL) radio resource control (RRC) message transfer message which is transmitted by a distributed unit (DU) of the gNB to a centralized unit (CU) of the gNB for allowing the first UE to access to the gNB,
receive, from the gNB, a response message as a response to the request message of the first UE to the second UE, and
transmit, to the first UE, the response message.

* * * * *